United States Patent
Borrell

(10) Patent No.: US 6,585,340 B1
(45) Date of Patent: Jul. 1, 2003

(54) ENVIRONMENTAL AND OPERATIONAL COLOR CALIBRATION, WITH INTEGRATED INK LIMITING, IN INCREMENTAL PRINTING

(75) Inventor: Ramon Borrell, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/146,858

(22) Filed: Sep. 3, 1998

(51) Int. Cl.⁷ .................................................. B41J 2/07

(52) U.S. Cl. ............................................ 347/14; 358/1.9

(58) Field of Search ..................... 358/504, 1.9, 1.13, 358/518, 523, 406; 347/14, 15, 19, 43, 17

(56) References Cited

U.S. PATENT DOCUMENTS

| | | | |
|---|---|---|---|
| 5,053,866 A | * 10/1991 | Johnson | 358/504 |
| 5,109,275 A | 4/1992 | Naka et al. | 358/80 |
| 5,237,344 A | 8/1993 | Tasaki et al. | 346/140 |
| 5,617,516 A | * 4/1997 | Barton | 358/1.14 |
| 5,633,662 A | * 5/1997 | Allen et al. | 347/19 |
| 6,042,211 A | * 3/2000 | Hudson et al. | 347/15 |
| 6,211,970 B1 | * 4/2001 | Cornell et al. | 358/1.9 |

FOREIGN PATENT DOCUMENTS

| | | | |
|---|---|---|---|
| EP | 0518378 | 12/1992 | G03G/15/00 |
| EP | 0836947 | 4/1998 | B41J/2/21 |
| EP | 0855832 | 7/1998 | H04N/1/60 |
| EP | 0868074 | 9/1998 | H04N/1/60 |
| JP | 57013445 | 1/1982 | G03F/3/08 |
| WO | WO9852762 | 11/1998 | B41J/2/01 |

OTHER PUBLICATIONS

Webster, Merriam. Collegiate Dictionary 10th. Edition. (Springfield, Massachusetts, Merriam–Webster Inc., 1993). p. 792.*

* cited by examiner

Primary Examiner—Huan Tran
Assistant Examiner—Julian D. Huffman
(74) Attorney, Agent, or Firm—Peter I. Lippman

(57) ABSTRACT

At least one environmental condition that affects color of a printed image is automatically sensed, just before printing. That information is then used to modify printer operation, to compensate specifically for effects of the condition on color. This is preferably accomplished using a transfer function calculated just before printing. Also preferably taken into account is a principal color-calibration profile, not prepared just before printing but rather substantially constant. If a replaceable colorant-placing module is in use—selected from many such modules—and the particular module has a characteristic property (such as drop weight or age of an inkjet pen) which affects the color of printed images, then preferably information about that property of the particular module is also automatically used to modify printer operation, to compensate for effects of the distinctive property on color. Interactive effects of environmental conditions and module characteristics are preferably also accounted for. If the printing medium in use has a sensitivity to excessive colorant deposition of colorant, at least one environmental condition that affects that sensitivity of the medium to excessive deposition is also automatically sensed, just before printing; and this information is then automatically used to modify printer operation, to limit the amount of colorant deposited. Instructions for automatic operation are placed in a nonvolatile device at the time of manufacture. Sensitivity data are empirically assembled from test patterns and used, preferably in algebraically signed form in regression calculations, to find coefficients for use in polynomials used to calculate the transfer functions.

59 Claims, 4 Drawing Sheets

Fig. 5
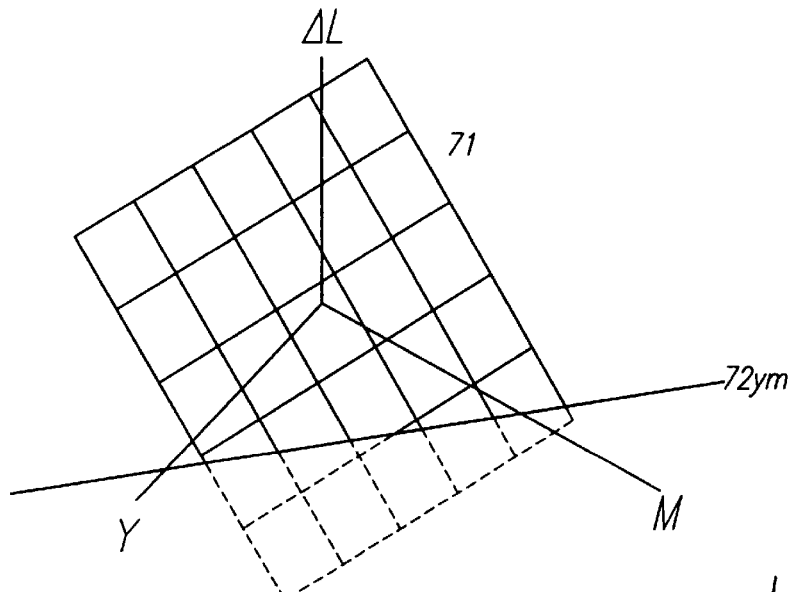
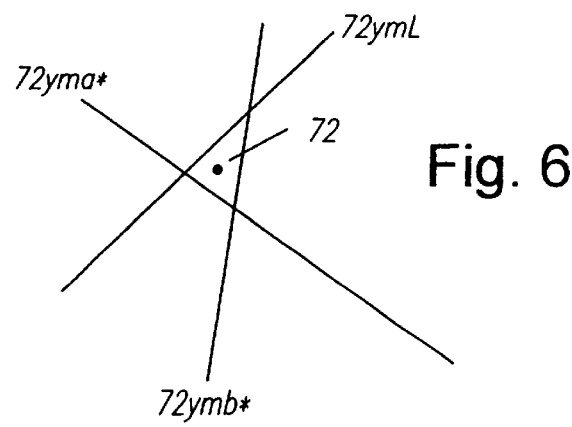
Fig. 6
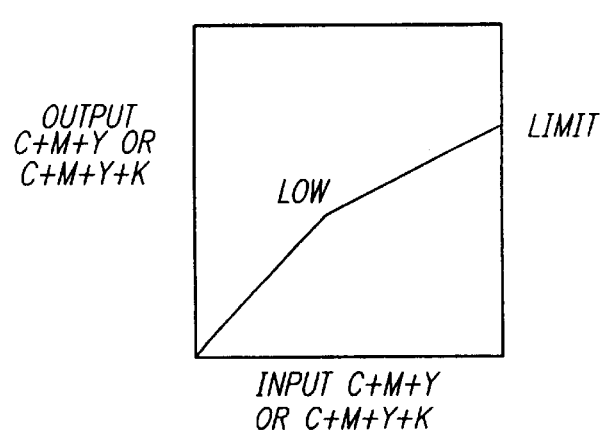
$$F(i) = \frac{650.25}{i} \cdot \left(low + \frac{limit - low}{300 - low} \cdot \left(i \cdot \frac{300}{755} - low\right)\right)$$
Fig. 7

ENVIRONMENTAL AND OPERATIONAL COLOR CALIBRATION, WITH INTEGRATED INK LIMITING, IN INCREMENTAL PRINTING

FIELD OF THE INVENTION

This invention relates generally to machines and procedures for incremental printing or copying of text or graphics on printing media such as paper, transparency stock, or other glossy media; and more particularly to a machine and method that construct—under direct computer control—text or images from individual colorant spots created on a printing medium, in a two-dimensional pixel array. For purposes of this document, by the phrases "incremental printing" and "incremental printer" I mean to encompass all printers and copiers that perform computer-controlled construction of images by small increments.

Incremental printers thereby form images either directly on the print medium—as in the case of inkjet, dot-matrix or wax-transfer systems—or on an electro-statically charged drum just before transfer to the medium as in the case of laser printers. Thus by "incremental printer" I mean to exclude printing presses, which form a whole image from a previously prepared master negative or plate. The invention employs calibration techniques to optimize color quality and to prevent overinking.

BACKGROUND OF THE INVENTION

The invention deals with two well-known problems of computer-controlled incremental printers: color quality, and overinking. Color quality will be discussed first.

Reproduction of colors in inkjet printers is greatly affected by factors such as the volume of ink delivered, the type of printing medium, the environmental conditions, and the spatial and temporal rules used to place the colorant on the medium.

In combination, these factors result in a final color rendition that may be very different from what is specified by the computer application. This undesirable result can be further classified into two types of reproduction: lack of accuracy and poor consistency.

By "accuracy" I mean the ability of the printer to print the exact color that is requested by the application. By "consistency" I mean the ability of a population of printers to print always the same color for a given color specification received from the application.

While there are well-known methods to improve color accuracy (usually by providing a color dictionary or color map), color consistency is far more difficult. This is due to the occurrence of factors that vary in a wide range and cannot be predicted at the time of building such color maps.

(a) Inconsistent color—Two types of solutions have been used heretofore to reduce color-reproduction error due to poor consistency. The more-widely used method creates a so-called "calibration profile" (similar to the color maps mentioned above) that remains valid as long as all the above-mentioned environmental and operational factors remain constant.

Preparing such a calibration profile or color map is time consuming, because many color patches must be printed and measured. It is also relatively costly, because it uses a significant quantity of the final ink and printing media—which are expensive in some cases.

It is well worth the effort and cost to prepare such a profile or map once, at the factory, for an entire printer product line, and to ship such a generic profile with each printer produced. This approach, however, has important limitations.

First, such a map preestablished at the factory, if generic to a product line, is inaccurate at the outset for many or most of the printers in the line. Second and more important, even if prepared for each individual printer, a map becomes obsolete whenever any of the printheads is replaced and whenever environmental or operational conditions change.

Third, setting up a printer to automatically make a complete color map for itself in the field—that is, after shipment to final users and perhaps even after each change of printhead, or of environmental parameters—is generally unacceptable because of the great time consumption and cost mentioned above. The present market is so highly competitive and demanding as to make the delay and cost alone appear prohibitive.

A known alternative to the use of complete maps or profiles consists of automatically printing—in the field—a much smaller number of color patches with each of the printheads, and automatically measuring them with an optical sensor in the printer. Results of these measurements are then incorporated into so-called "transfer functions", one for each printhead, which reconcile the expected and measured values.

The transfer functions are then applied, immediately before printing, to color data provided by the application. This second method is far faster and less costly than building complete color maps, but still takes several minutes and still wastes printing medium and ink.

Furthermore, as with the first method, the calculated correction rapidly becomes obsolete with changes in environmental or operating conditions. As a consequence, the process must be repeated very often if the desired consistency in color reproduction is to be maintained. Even with these burdens, the transfer-function approach is less complete than the use of calibration profiles, and therefore inferior in terms of final image quality.

Some prior systems are believed to have included an automatically followed protocol for deciding when to calibrate, for instance when an operator commands it or when an inkjet pen or laser toner cartridge is changed, or when the printing medium is changed. Even with such automatic procedures—and an optical sensor built into the printer so that the user does not have to actively participate in performance of the map-making—delay and cost in the present competitive market greatly handicap the transfer-function approach too.

Representative of the second (transfer function) approach is U. S. Pat. No. 5,107,332 of Chan. He teaches use of automatically, continuously field-maintained transfer functions to "continuously update an initial full scale look up table which was initially prepared from a full scale color gamut."

It is not completely clear what Chan means by "continuously", since it would not appear practical to implement that description literally while at the same time printing a desired output image. Presumably his invention instead makes its small test patterns automatically between image printouts or perhaps once a day, or every time a certain number of images has been printed.

It is not my intention to criticize the Chan system, since it undoubtedly functions very well and serves an excellent purpose. As can be seen, however, it does leave some room for further improvement.

Of particular interest are two printer-control languages that have previously been created or adapted for Hewlett Packard (HP) inkjet printers, and particularly large printer/ plotters. One of these languages was developed by HP and is known as "HP-GL/2"; the other, developed by the Adobe company, is called "PostScript®". These languages heretofore have remained subject to undesirable print-quality inconsistencies, as discussed above, arising from environmental and operational variations.

The PostScript system has historically employed a transfer-function approach. HP-GL/2 has not.

For printing color images, the PostScript system enables a user to define such functions for whatever purpose the user wishes. A typical usage is for linearization of each ink individually—or to linearize a display device with respect to a scanner, or as between two different display devices. Any such defined transfer function is applied by PostScript to the desired image data—after those data have been interpreted using a principal color calibration profile that nominally interfaces a known image-data source with a known printer.

(b) Inconsistent ink-limiting requirements—The known technique of ink limiting is used to avoid depositing excessive amounts of ink in some special situations, particularly when printing in certain chromatic inks on certain media, such as glossy stock. For example, it appears that particular inkjet inks contain relatively large pigment molecules that are not readily absorbed into the relatively smaller pores of some glossy media.

To achieve vivid colors in inkjet printing with aqueous inks, and to substantially fill the white space between addressable pixel locations, ample quantities of ink must be deposited. Doing so, however, requires subsequent removal of the water base—by evaporation—and also requires, for some printing media, absorption of the pigment into the medium. These drying phenomena can be unduly time consuming.

In addition, if a large amount of ink is put down all at substantially the same time, within each section of an image, related adverse bulk-colorant effects arise: so-called "bleed" of one color into another (particularly noticeable at color boundaries that should be sharp), "blocking" or offset of colorant in one printed image onto the back of an adjacent sheet with consequent sticking of the two sheets together (or of one sheet to pieces of the apparatus or to slipcovers used to protect the imaged sheet), and "cockle" or puckering of the printing medium.

One situation in which the overinking problem becomes particularly important is in the printing of so-called "process black" or "composite black"—since ink loading is some three times what it would be for single-ink black. This might seem to suggest that composite black always should be replaced with black ink, but doing so sometimes produces other uncontrollable effects such as changes in the apparent glossiness of the medium, or erratic angular dependencies of the color or reflectance.

Furthermore the use of process black has its own advantages. Process black tends to reduce evident granularity, particularly in highlight regions, and—as some would have it—also produces richer and more interesting shades.

What is needed is a dosing technique that has some potential for at least partially avoiding process-black replacement, and so retaining these benefits of process black—but that can be carefully controlled. It is necessary to find a way to avoid exceeding the ink-absorption capability of the medium. Ink limiting, which controls overinking directly, can accommodate that capability and so function as an alternative to process-black replacement.

I have recognized, however, that the ink-absorption capability of the medium, like the overall color response discussed in the preceding section, shifts with environmental and other operating conditions. Therefore, as with color consistency, ink limiting is especially problematical when those operating conditions change after an ink-limiting paradigm has been established.

Ink limiting can be of critical importance. For some inkjet systems, glossy stock may be completely unusable without ink limiting; yet prior ink-limiting systems have always been subject to undesirable variation due to environmental conditions and to characteristics of replaceable colorant modules (e. g., inkdrop weights).

(c) Environmental inputs—In some known incremental printers, sensors are used to determine environmental conditions that affect operation of the printer as such, or closely related factors such as image drying time. U. S. Pat. No. 5,617,516 of Barton describes one such inkjet system that monitors temperature and humidity "for optimizing printer operation". Certain laser (color electrophotography) printers employ like sensors to optimize toner development—as through adjusting bias voltage on an image-transfer drum.

In these earlier systems, the optimization of operational settings based on the environmental sensors has necessarily had some indirect or incidental effect on (and usually an improvement of) the quality or even balance of color in printed images. In these devices, however, the environmental measurements have never been used for direct, specific control of color or color balance as such.

(d) Conclusion—As shown above, problems of color consistency and ink-limiting consistency have continued to impede achievement of uniformly excellent inkjet printing—at high throughput—on various industrially important printing media. Thus, important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of operating an incremental printer with a printing medium. The method of this first aspect of the invention includes the step of automatically sensing, immediately before printing, at least one environmental condition that affects color of a printed image.

For purposes of this document, by the term "immediately" I refer to a time scale that is short in relation to expected changes in environmental conditions of interest. By the phrase "sensing . . . at least one environmental condition" I particularly mean sensing such a condition or conditions explicitly; in Chan and the other prior systems discussed earlier, the effects or consequences of such conditions are merely embedded, blind, into each field-generated transfer function or other automatic calibration.

The phrase "before printing" encompasses the strategy of sensing an environmental condition or conditions before printing an entire image. In addition this phrase encompasses sensing such a condition or conditions during the printing of an entire image—i. e., just before printing of a particular swath, or of a particular pixel row, or even an individual pixel.

It will be understood too that in this document the word "color" is used in the larger sense to encompass black as well as chromatic colors. Although the present invention is particularly beneficial in avoiding hue shifts due to environmental changes, it is also useful in linearizing and otherwise improving consistency of even images printed in black or other monochrome colorant.

The method of this first facet of the invention also includes the step of automatically using the sensed environmental condition or conditions to modify operation of the printer, to compensate specifically for effects of the at least one environmental condition on color. This step is performed after the sensing step.

The term "specifically" is used here to make clear that the invention particularly implements a calculated color correction. In other words this modification does not affect color merely in an incidental way, as for instance in the previously mentioned case of environmentally derived automatic adjustments of prior-art laser printers.

The foregoing may constitute a description or definition of the first facet of the invention in its broadest or most general form. Even in this general form, however, it can be seen that this aspect of the invention significantly mitigates the difficulties left unresolved in the art.

In particular, because this method adjusts itself instantly for one or more external operating conditions, it very straightforwardly avoids color inconsistencies arising from variations in those conditions. As an additional advantage, in purest principle some embodiments of my invention can be made to correct for conditions that change significantly even during printout of a single image.

Although this aspect of the invention in its broad form thus represents a significant advance in the art, it is preferably practiced in conjunction with certain other features or characteristics that further enhance enjoyment of overall benefits. For example, it is preferred that the using step also be in accordance with a color calibration profile that is not prepared immediately before printing.

In other words, what is done in response to variable conditions can be only an adjustment to the overall color calibration for the printer, not a complete calibration with photometric analysis of freshly printed test patterns and so on. Because of this approach, making the correction for environmental conditions takes virtually no time (typically much less than a second) and wastes neither printing medium nor ink. These considerations represent substantial savings by the end user, and also improved productivity.

Another preference is applicable when the method is used with any replaceable colorant-placing module (such as for example an inkjet pen, or a laser-printer toner cartridge) which is selected from multiple such replaceable modules. This preference is applicable if each such particular replaceable module has at least one characteristic distinctive property which affects the color of printed images.

In these cases, preferably the method further includes the step of automatically using information about the distinctive property of the replaceable module to modify operation of the printer—to compensate for effects of the distinctive property on color. In this way the invention avoids color inconsistency arising from variability of not only external conditions but also internal operating conditions.

Other preferences, as mentioned earlier, include combination of this first aspect of the invention with other aspects discussed below. Additionally, some preferences that will be mentioned for the later aspects are applicable to this first facet as well.

In preferred embodiments of a second of its main aspects, the invention is a method of operating an incremental printer, with a printing medium that has a sensitivity to excessive deposition of colorant or a carrier thereof. This method includes the step of automatically sensing, immediately before printing, at least one environmental condition that affects the sensitivity of the medium to excessive deposition of the colorant or carrier.

The method also includes the step of then automatically using the sensed at least one environmental condition to modify operation of the printer, to limit the amount of colorant deposited. This using step thereby avoids excessive colorant or carrier deposition.

The foregoing may constitute a description or definition of the second facet of the invention in its broadest or most general form. Even in this general form, however, it can be seen that this aspect of the invention too significantly mitigates the difficulties left unresolved in the art.

In particular, in this facet of the invention the above-summarized benefits as to color consistency are extended to automatic ink limiting (AIL) instead—or as well, if the two aspects of the invention are practiced in conjunction.

In preferred embodiments of a third basic aspect or facet, the invention is a method of operating an incremental printer, with a printing medium. The method includes the step of automatically sensing, immediately before printing, at least one environmental condition that affects color of a printed image.

Another step is then automatically applying a combination of a principal color calibration with a transfer function, to modify operation of the printer. A further step is automatically using the sensed at least one environmental condition to modify substantially only the transfer function. In this way the principal calibration is enabled to be a substantially constant characterization of the printer.

The foregoing may consitute a description or definition of the third facet of the invention in its broadest or most general form. Even in this general form, however, it can be seen that this aspect of the invention significantly mitigates difficulties left unresolved in the art.

In particular, preferred embodiments of this third facet of the invention are beneficial in advancing the art of incremental printing: this aspect of the invention focuses upon the advantage of adjusting only a small refinement or correction curve for the overall color-calibration profile of a printer. This is far more efficient than attempting to rebuild that overall profile in the field and in real time.

Although this third aspect of the invention in its broad form thus represents a significant advance in the art, it is preferably practiced in conjunction with certain other features or characteristics that further enhance enjoyment of overall benefits. For example, here too it is preferred that the automatic applying step include using a principal calibration that is not prepared immediately before printing.

This preference in effect exploits the above-noted advantage that it is not necessary to rebuild an overall profile in real time. A far better overall calibration can be prepared at the factory, with superior measuring instruments and the advantages of human evaluation and intervention. Other preferences will appear from the following discussion of other aspects of the invention.

In preferred embodiments of a fourth of its aspects, the invention is an incremental printer for use with a printing medium. The printer includes some means for placing colorant on such medium to form an image. For purposes of breadth and generality in describing my invention, I shall refer to these means as simply the "colorant-placing means".

The printer also includes at least one sensor for sensing at least one environmental condition that affects color of the formed image. In addition the printer includes an automatic processor for controlling the placing means to form the image. References throughout this document to a processor or a memory device comprised by the printer shall be understood, even where not expressly indicated, to encompass a processor or memory device in a computer that controls the printer; such relocation of processor and memory functions as between printer and computer is a well-known equivalent.

The processor includes some means for automatically operating the sensor or sensors immediately before printing. These means, again for generality and breadth, I shall call the "sensor operating means".

In addition the processor includes some means for using the sensed at least one environmental condition to modify the controlling of the placing means. These means, once again, I shall call the "using means". The modification performed by the using means operates to compensate specifically for effects of the at least one environmental condition on color.

The foregoing may describe or define preferred embodiments of the fourth facet of the invention in its broadest or most general form. The reader will note that this aspect of the invention is closely related to the first (method) aspect discussed earlier, and enjoys similar benefits in the art. I shall discuss here at greater length some of the preferences applicable to both these related method and apparatus forms.

One such preference is that the printer further include some nonvolatile means for holding instructions for automatic operation of the sensor or sensors and the processor, including the environmental-condition using means. Such nonvolatile means may include the memory devices of an interconnected computer, holding a printer driver or other like software—or may include a read-only memory (ROM) that holds firmware for controlling the printer processor directly. Alternatively the automatic processor may take the form of an application-specific integrated circuit (ASIC), whose "instructions" are embedded into the structure of the circuit itself.

Another preference, mentioned earlier as to method aspects of the invention, is that the processor further include some means for performing the placing-means controlling in accordance with a color calibration profile that is not prepared immediately before printing. In this case it is preferable that the printer or driver (or both) further include some nonvolatile means for holding the color calibration profile. Such a profile advantageously is loaded into these nonvolatile means as part of the manufacture of the printer—or, equivalently, of the compilation of a printer driver.

Yet another preference is that the colorant-placing means include at least one particular replaceable colorant-placing module selected from multiple such replaceable modules— each such module having at least one respective characteristic distinctive property which affects the color of the formed image. In this case the system further preferably includes means, connected to the processor, for providing to the processor information about the distinctive property or properties of each selected replaceable module. To complete this preference, the processor further includes some means for using the distinctive-property information to modify the "controlling", to compensate for effects of the distinctive property or properties of each selected replaceable module on color.

Still another preference is that the "at least one" sensor include sensors for sensing plural environmental conditions.

A yet further preference is that the processor also include means for using the sensed environmental condition or conditions and the distinctive-property information together; here the purpose is to compensate for interactive effects of the environmental condition or conditions, and the distinctive property or properties, on color.

This last-mentioned preference can be particularly important as it avoids the print-quality-degrading effects of assuming independence of the several conditions or properties. By taking into account the environmental conditions and in particular the interactions between them—and their interactions with the inkdrop weight or other distinctive characteristic of a replaceable module—the system becomes extraordinarily robust, especially when a humidity-sensitive printing medium is in use.

Preferably the invention accommodates environmental conditions such as humidity, pressure, and temperature; and operating conditions such as type and/or color of such media, and resolution; and replaceable-module properties such as magnitude of a quantized colorant quantity (e. g. inkdrop weight) and/or age of the module—and all preferably with accounting for interactions. Also preferably the information-providing means include means associated with each replaceable module for conveying to the processor information about the respective distinctive property.

For example, my invention can make direct use of inkdrop weight data that have been factory-encoded directly into a simple memory device of an inkjet pen. At run time the printer reads these data from the pen, to establish the drop weight for incorporation into the calculations of my invention. The result is color rendition, color quality, hue balance, etc., that are specifically adjusted for the inkdrops of that particular weight ejected by that particular pen.

As to preferred embodiments of a fifth of its aspects, the invention is an incremental printer for use with a printing medium that has a sensitivity to excessive deposition of colorant—or a carrier of the colorant. The printer includes colorant-placing means, and at least one sensor for sensing at least one environmental condition that affects the sensitivity of the medium to excessive deposition of the colorant or carrier.

The printer also includes an automatic processor for controlling the colorant placing means to form the image. The processor further includes some means for using the sensed environmental condition or conditions to modify operation of the processor, specifically to limit the amount of colorant deposited and so avoid excessive colorant or carrier deposition.

From this it may be seen that the fifth facet of the invention is closely related to the previously introduced second (method) aspect of the invention, and will share many benefits and preferences with that second aspect. At the same time this fifth aspect of the invention shares certain basic preferences with the fourth (apparatus) facet of the invention—as for example, the incorporation of nonvolatile means for holding operating instructions, and the accommodation of environmental and operating conditions listed earlier.

A sixth aspect or facet of the invention is, in its preferred embodiments, an incremental printer for use with a printing medium. It includes colorant-placing means and at least one sensor for sensing, immediately before printing, at least one environmental condition that affects color of the image. In addition the printer includes an automatic processor for controlling the placing means to form the image.

The processor includes some means for applying a combination of a principal color calibration with a transfer function, to modify the controlling of the placing means, and also some means for using the sensed environmental condition or conditions to modify substantially only the transfer function. In this way the principal color calibration is made a substantially constant characterization of the printer.

The foregoing may be a definition or description of the sixth aspect of the invention. As will be understood this facet of the invention is closely related to the third (apparatus) aspect; and the two share various benefits and preferences.

In preferred embodiments of a seventh of its main aspects, the invention is a method for establishing and using a tabulation of coefficients for use in producing consistent response of an incremental printer. This method is applicable to such a printer whose image characteristics are subject to variable environmental or operating conditions, or both.

The method includes the step of establishing a set of parameters that are the variable environmental or operating conditions, or both. Such parameters for example may include humidity and inkjet drop weight.

The method also includes the step of establishing, for each parameter, values that are anticipated in use of the printer. Thus, continuing the above example, the values may include three to six values of humidity and four to six values of drop weight.

A further step is printing test patterns using crosscombinations of the established values. Still extending the same example, such crosscombinations could include a number of humidity/drop-weight pairs—the actual number being somewhere between 3×4=12 pairs and 6×6=36 pairs, inclusive. If other environmental or operating conditions (for instance temperature and/or printing-medium type) are included in the parameter set, the total number of crosscombinations increases multiplicatively.

(Each test pattern, in turn, most typically consists of crosscombinations of colorant levels for the colorants used in the system—or if a monochrome system is in use each test pattern consists of a one-dimensional ramp. The idea of such test patterns is generally to canvass the available colors in the system, and, for chromatic systems, to do so particularly near the neutral gray axis.)

Yet another step is photometrically measuring the test patterns. This step produces numerous sets of measurement results, one full set of color specifications for each crosscombination of environmental and operating conditions.

Another step is defining at least one output image specification of interest. For example, for each colorant I define four or five output specifications, which as will be seen include two at endpoints of the system dynamic range and two or three intermediate points. The latter I select, in chromatic printers, to be of maximum usefulness in adjusting the output response for combined chromatic colorants near the neutral-gray color axis.

Another step is, for each crosscombination, calculating photometric error with respect to the at least one defined output specification. In other words, I compare each photometric measurement result with a corresponding one of the defined output image specifications of interest, and subtract to determine the difference.

Now with this array of "photometric errors" (differences) before us, I begin a two-stage interpretive process. In the first stage, for each crosscombination, I first search or analyze the photometric errors to find an input inking specification that substantially produces the at least one defined output specification.

Here I say "substantially" for two reasons. In many cases of greatest practical interest, no single input inking specification can physically produce the defined output. Moreover, even when a single input may in principle produce the defined output, it is not necessary to find a single input that is absolutely precise or accurate in this regard.

In the second stage of the two-stage interpretation, I further analyze the input inking specifications found for the crosscombinations. This step is performed in such a way as to find and tabulate coefficients for use in taking the variable conditions into account, to print a desired image.

Yet another step is storing the coefficients for later application to control operation of the printer. At the outset these coefficients typically reside in general-purpose computers at a design or engineering facility.

In due course these coefficients—or selected or refined values of them—are stored in printer drivers or in printer ROM modules, or are structurally embedded in ASIC devices. These are provided, with or as part of printer products, to users in the field.

The foregoing may represent a description of definition of the seventh aspect or facet of my invention in its broadest or most general form. Even as couched in these broad terms, however, it can be seen that this facet of the invention importantly advances the art of incremental printing.

In particular, this facet of the invention provides an analytical way, or if preferred a very nearly analytical way, to acquire and accumulate all the numerical information necessary to successful practice of the run-time aspects of the invention—in hundreds of thousands of units of an incremental printing system, for years thereafter. Furthermore if during the life of such a product line it becomes necessary to update the system for newly available types of printing medium, or for different disposable-module characteristics (such as a new range of drop weights), once again that expanded parameter set or parameter-value set is very readily accommodated by again using the same analytical or nearly analytical procedure.

It should be understood that such updating need not require incorporation into a new printer at the time of manufacture. To the contrary, such updating may require only a new printer driver, or a new firmware ROM, or at most a new ASIC. Such levels of replacement, including the necessary measurements and calculations, may be accomplished as aftermarket activity, either by the original manufacturer directly or by other authorized vendors.

Although the seventh major aspect of the invention thus significantly advances the art, nevertheless to optimize enjoyment of its benefits I prefer to practice this aspect of my invention with additional features or characteristics. In particular, I prefer that the first searching or analyzing step include entering the photometric errors, in association with the corresponding input inking specifications, into a regression calculation.

That calculation fits the calculated photometric errors to at least one colorimetric function. More specifically, as a practical matter, each colorimetric function is normally a function of the input inking specifications.

Another preference is that the entering step include expressing the errors in an algebraically signed form. In earlier efforts employing a more-conventional sum-of-squares or so-called "energy" methodology throughout, I discovered that with such methodology the ability to locate minimum error in this environment is relatively insensitive, and in fact subject to ambiguity. By retaining the algebraic sign of the errors in certain parts of the regression, I preserve the ability to see zero crossings and thereby most precisely locate minimum-error points.

Yet another preference is that the at least one colorimetric function include a family of two-dimensional surfaces in a three-dimensional calculation space. That space has three orthogonal variables, namely: error in one perceptual color dimension, and two varying inks. In this case I further prefer that the first searching or analyzing step further include, for each crosscombination, deducing the input inking specification from the family of two-dimensional surfaces. In using this technique, any one of several tactics may be employed, including:

further evaluating the regression calculations to concurrently match zero photometric error for each of three substantially orthogonal perceptual color dimensions respectively;

for plural candidate input inking specifications, concurrently displaying numerical representations of photometric error values, in a region of the above-described three-dimensional calculation space generally established by the family of two-dimensional surfaces, to facilitate manual selection of one of the candidate specifications based upon consideration of the concurrently displayed numerical representations;

displaying graphical representations of a region of the above-described three-dimensional calculation space generally established by the family of two-dimensional surfaces, for visual interpretation thereof, to facilitate manual selection of the input inking specification therewithin based upon said visual interpretation; and locating a center of gravity of a geometrical figure bounded, substantially in a zero-photometric-error plane in the three-dimensional calculation space, by the family of two-dimensional surfaces.

Another, more general, preference is that the further analyzing step include entering the input inking specifications into another regression calculation that fits the found input inking specifications to the environmental or operating conditions, or both.

Those skilled in the art will understand that the seventh aspect of my invention as described above is complete when the coefficients have been determined. It will also be understood, however, that eventually the determined coefficients are to be applied to control operation of a printer, and in fact a very large number of printers. Accordingly such application, too, is a preferred step of the seventh aspect of my invention, now under discussion.

That applying step, in turn, preferably includes using the coefficients to produce from input image data a modified form of the input image data, corrected for the environmental or operating conditions or both, for use in controlling the printer to print a desired image.

Preferably the image characteristics to be optimized, through use of the seventh aspect of my invention, include color; and the test patterns include combinations of plural inks of different ink colors. Preferably, for each of the plural inks, the test patterns include multiple inking levels.

For purposes of the seventh main aspect of my invention preferably the parameters are selected from among these: humidity, temperature, pressure, resolution, the type of a printing medium to be used with the printer, the color of such medium, the age of a disposable module (such as an inkjet pen) to be used with the printer, and the magnitude of a quantized colorant quantity (such as inkdrop weight) to be applied by the printer to such medium.

All of the foregoing operational principles and advantages of the present invention will be more fully appreciated upon consideration of the following detailed description, with reference to the appended drawings, of which:

BRIEF DESCRIPTION OF THE DRAWINGS

FIG. 5 is a conceptual graph showing representative yellow- and magenta-sampled test-pattern data, manifested as a two-dimensional surface in a special "YM$\Delta$L" calculation space, intersecting the zero lightness-error ($\Delta$L) plane in that same space, with the portion of the surface that extends below that plane shown in the broken line—as part of a correlation step discussed in the text;

FIG. 6 is a conceptual graph showing a representative assemblage of such intersections in a zero-error plane, or near that plane, part of an input-specification deduction step also discussed in the text;

FIG. 7 is a graph analogous to that of FIG. 2 but showing automatic ink-limiting relationships, together with an algebraic equation used for implementation of AIL in the HP-GL/2 system.

DETAILED DESCRIPTION OF THE PREFERRED EMBODIMENTS

1. System Structure and Operation

Figure 1:
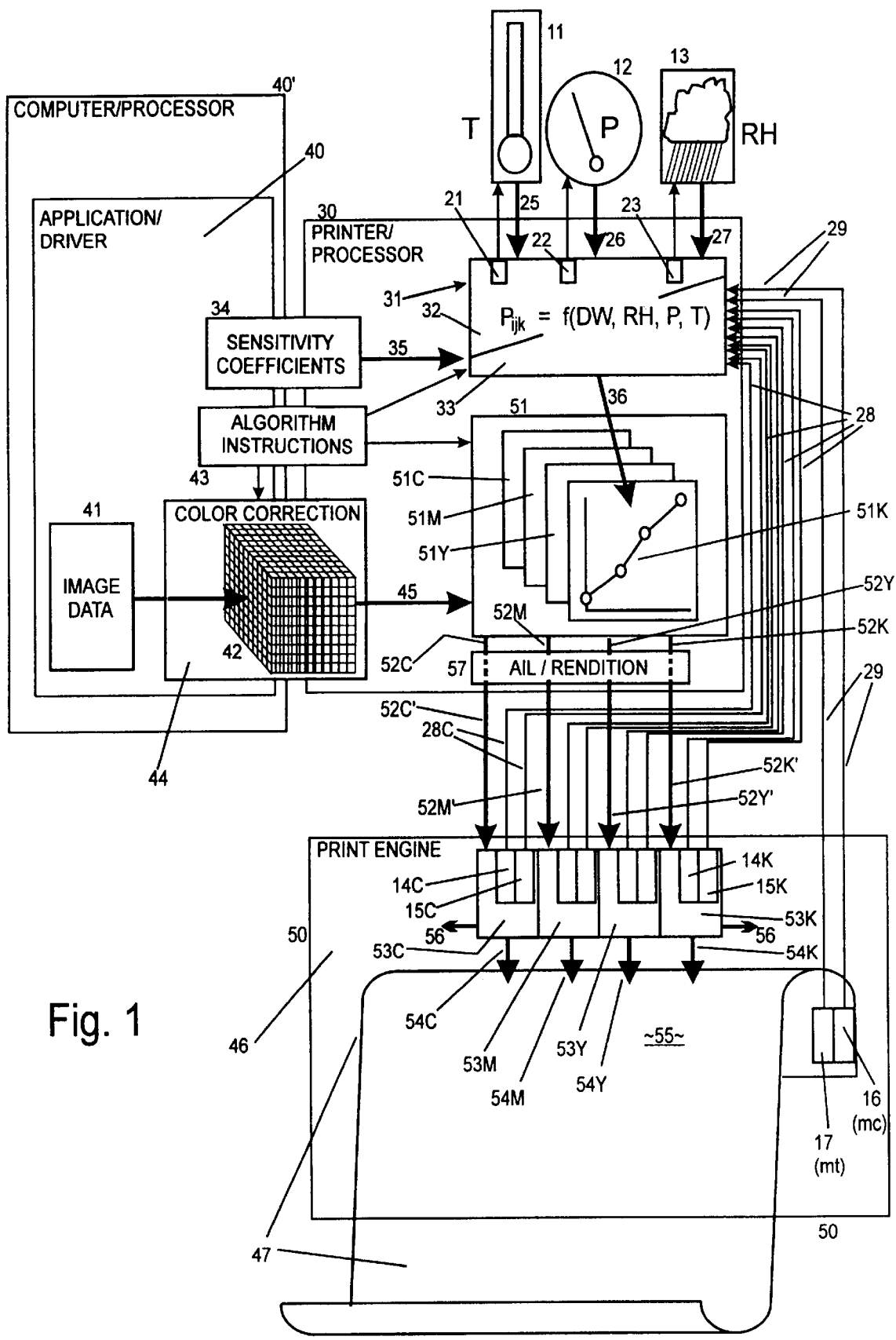
FIG. 1 is a conceptual block-diagrammatic representation of a hardware system according to preferred embodiments of the invention.

As my foregoing summary indicates, the present invention takes a new approach to dividing the tasks of color calibration between different time periods. My invention collects certain information long in advance of printing of an image, and other information immediately before or even during such printing—i. e., in so-called "real time".

What is collected in advance is an overall or principal color calibration profile 42 (FIG. 1) as before, plus an extensive assemblage 34 of details as to the sensitivity of that profile to several important environmental variables T, P, RH and internal operating variables DW, mt, mc and to some combinations of them. (In preferred current practice of the invention, the pressure P and media type/color mt, mc are not used.) Preferably the profile 42 and sensitivity data 34 are determined at the factory and as part of characterization of an entire printer product line.

The principal profile 42 is nominally the same as previously prepared in the PostScript or HP-GL/2 systems, and is applied 44 to desired input image data 41 to obtain color-corrected image data 45—substantially as in prior-art systems. I shall not dwell on the principal color calibration profile 42 or operation of the color-correction block 44, since they are generally conventional and in any event are available as part of the commercial PostScript package from Adobe.

The resulting color-corrected image data 45 then proceed through an intermediate step 51 of adjustments from lookup tables (LUTs) 51C, 51M, 51Y, 51K. As mentioned earlier, this step is optionally present in those earlier systems that offer the PostScript transfer-function feature. My invention, however, makes the adjustment step 51 depend upon the environmental and operational sensor inputs 25–29, their related sensitivity data 34, and the LUT calculations 31. Finally the adjusted data 52C, 52M, 52Y, 52K pass through AIL and rendition 57 to a print engine.

Derivation of the sensitivity data 34 will be explained shortly. That derivation, like preparation of the principal profile 42, of course is quite time-consuming and expensive, but amounts to an investment that can be allocated over the whole product line. Accordingly the cost of preparation becomes essentially trivial for each printer unit 30, 50 and each printed image 55.

What is collected in real time is simply an assemblage of the actual current values T, P, RH, DW, mt, mc of the environmental and internal operating variables. This later collection step takes only moments—typically much less than a second—but it enables the printer 30, 50 to update the entire color-calibration profile 34 without any delay of magnitude noticeable to the human operator.

The purely environmental data T, P, RH are acquired by sensors 11–13 mounted in the printer, preferably in a well-ventilated area for sensing ambient conditions. It is these conditions that are most relevant to drying phenomena, which largely take place in an image receiving bin or tray, essentially outside the printer. The sensors 11–13 are therefore typically remote from the printing media 47 and pens 53C, 53M, 53C, 53K.

In the now-preferred embodiments of my invention, pressure is not monitored. The temperature sensor 11 is obtained from National Semiconductor of Santa Clara, Calif., USA, as model LM34; and the humidity sensor 13 from Humire of Toulouse, France, as model THS 1101.

A fundamental assumption underlying this new approach is that the sensitivity of the characterization to the several variable factors is stable. I have very carefully and quantitatively validated this assumption for the system that employs my invention.

The most challenging aspect of that validation related to disposable supplies, notably inkjet pens 53. Previous disposables drifted severely, the magenta pen 53M being most subject to progressive drift of conditions at the ink-ejection aperture.

In work related to the present invention, it was found that such drift could be sharply curtailed, particularly by controlling very closely the delivery of ejection energy to the pen resistors. The initial condition of the pen was thereby stabilized, with drift from that condition well below a threshold that previously had prevented attainment of reliable color calibration through my invention.

Based upon that improved stability, I have found that inkdrop weight respectively ejected by each pen can be determined at the factory, encoded directly into a memory device 14C, 14M, 14Y, 14K in the respective pen, and then read out by the printer—from the pen memory 14—in real time as defined above. Before starting a particular image, pens can be changed and if desired a previously used pen can be replaced in the printer: essentially without missing a beat, the printer adjusts itself appropriately to the particular pen currently in use.

Now, the sensitivity data 34 collected in advance are readily stored in a memory of the printer 30, 50, or in an application-specific printed circuit in the printer, or if preferred in a printer driver associated with the computer 40' that runs the controlling application 40. If preferred, some of the data can be stored in one of these locations or in one form, and other data can be stored in others of these locations or in different forms. Similarly the color correction operations 44, and the principal color calibration profile 42 used in those operations, if desired can be allocated as between the printer/processor 30 and the application 40.

These several options are symbolized in the drawing by showing the sensitivity data 34, the algorithm instructions 43 and the operational functions 44 as located partially within the application and computer blocks 40, 40' and partially within the printer block 30. Although some distribution of functions is feasible, it will be understood that in practice each of the three functions 34, 43, 44 is most typically in only one or the other (application/computer or printer), not both. In particular the principal profile 42 is preferably part of the driver 40, and so stored in the computer 40', for HP-GL/2 but is in the printer 30 for PostScript.

Included in the precalculated sensitivity data 34, as previously mentioned, are all the independent sensitivities and their crosscombination effects. These factors include characterizations for different environmental temperatures, humidities and air pressures if desired, and different internal operating conditions—particularly real inkdrop weights for each printhead, media characteristics, and printing resolutions.

Temperature T and humidity RH, and pressure P if desired, are provided by sensors 11–13 in the printer 30, 50. Upon command from querying devices 21, 22, 23 in the printer, these data are read 25, 26, 27 in real time into the calculation $P_{ijk}$ from those sensors, for combination with the internal operating data (including the inkdrop weights 29 read from the pens and print-media color and type 29 as desired) and with the sensitivity data 34.

In the drawing, merely for purposes of definiteness the real-time computation block 31 is symbolized as generally divided in two, with purely environmental data 25–27 received in the upper portion 32 as illustrated, and internal operational data 28, 29 received in the lower portion 33. (As mentioned earlier, that distinction between environmental and operational information is not observed throughout this document, but only to the extent convenient.)

Also included in the advance-collected data are instructions 43 for performing the real-time calculations 31, $P_{ijk}$ to derive 36 the LUTs 51 needed to complete the preparation for printing. More specifically, the realtime calculations 31 consist primarily of calculating transfer-function LUTs 51C, 51M, 51Y, 51K for every ink and printhead 53 in use.

When interpolated, these transfer-function LUTs will adjust the color-corrected image data 45 for the realtime-monitored deviation of the environmental and operational factors $25 \cong 29$ from nominal values. For each printhead 53, the printer processor 30 (or application 40, as mentioned above) uses the prestored mathematical model 43 and sensitivity data 34 to calculate several points P1–P4 (FIG. 2) of the respective transfer function 51C etc.

Then when a color-corrected image color specification 45 is to be printed, the system finds the corresponding numerical values in the LUTs 51—interpolating between those points P1–P4 as needed. The corresponding output values from the LUTs are reassembled to obtain a complete output color specification, which then passes through rendition 57 to the print engine 50, to print 54 the image 55. The result is consistent color quality without user intervention.

In my now-preferred embodiment each entire page is calculated out before printing of that page begins. My invention, however, also encompasses continuing acquisition of sensor data after page printing starts, and modification of the data accordingly if the variables change significantly. As will be understood, such a mode of operation can be beneficial for printing of large projects that may span long time intervals, and may thereby span important changes in environmental variables.

For satisfactory operation of such a midstream-readout system it will be necessary to deal with several conceptual obstacles. Humidity sensors are noisy, and for present purposes humidity sensing itself may be subject to inherent low-frequency noisiness.

Such noisiness may be partly due to undefined air-circulation patterns and undefined speeds of draft currents in a printer, or even in a room where the printer is operating. In the end a satisfactory implementation may depend upon a question of definitions, as to what humidity it is that is to be sensed.

For instance it may be necessary to impose a forced-air circulation on at least the printer enclosure, to achieve a stable result. Resort to such strategies may not be out of the question, where the highest possible image-quality consistency is sought in a very large printout.

For an ASIC-controlled system, in which information passes in lockstep through many successive processes in a so-called "pipeline", incorporating midstream environmental readouts and color adjustments would appear to be impractical as a modification. In other words, the opportunity for developing such a system would seem to require the occasion of an entirely new ASIC design.

2. Transfer Functions

At run time, as explained above, my invention changes the so-called "contone" color values 45 before dithering or error diffusion 57—to compensate for sources of color variation that can be predicted. The correction is made by the PostScript system using the transfer-function LUTs 51, not to be confused with the master or principal color-calibration profile LUT 42.

In my currently preferred embodiment, firmware 43 in the printer 30 calculates the transfer-function LUTs 51 before page printing begins. As noted above, however, incremental adjustments during printing are possible in principle.

A representative LUT (FIG. 2) consists of just four data points P1 through P4, between which values are interpolated. I currently prefer a linear interpolation, but optionally a polynomial of, say, the third degree can be substituted.

Taking the illustration as representing the intensity level of a colored light, as in particular one of an RGB signal triad, full-scale (1.0) corresponds to white. The top-right data point P1 thus represents the no-ink condition: I fix it to the value (1,1) because I do not want to add any ink to white.

Conversely the bottom-left data point P4 corresponds to a maximum-ink situation. I have reserved this memory position for use in correcting nonlinear behavior due to saturation, but in my present implementation for some media P4 is clamped to the fixed value (0,0). This is not the case with glossy or coated media, for which some adjustability about a nominal value is desired; since negative inking has no physical meaning, the nominal value therefore is preferably shifted upward and inward, into the dynamic range of the system.

In setting this value, I prefer to start by assuming that the amount of adjustability (and therefore the magnitude of such a shift) will be about the same as the range of variation about P3 for the printing medium under consideration. Such a shift, however, cuts into the effective gamut of the system at that nominal point. If this gamut reduction is significant for the particular combination of print medium and inking strategy, then I instead establish a nominal P4 value that is smaller—basically as a tradeoff between desired adequate adjustability and desired minimum incursion into the gamut.

The two intermediate points P2 and P3 are determined experimentally, particularly aiming to minimize chroma when printing neutral grays. As will be recalled from the introductory discussion of transfer functions, the basic function of a curve such as FIG. 2 can include linearizing the response with respect to one color; as will be seen from section 4 below, this is preferably done in such a way that linearization occurs with respect to RGB components rather than CMYK.

Before printing, the output level $OL_i$ for each data point i=2 or 3 (i. e., for points P2 and P3 in the graph) is calculated using a polynomial function with ten terms. The function is:

$$OL_i = C_{i0} + C_{i1}DW + C_{i2}RH + C_{i3}T + C_{i4}(DW)^2 + C_{i5}(RH)^2 + C_{i6}T^2 + C_{i7}(DW)(RH) + C_{i8}(RH)T + C_{i9}(DW)T,$$

in which DW is drop weight read from the pen, and RH and T are relative humidity and temperature as read from substantially conventional humidity and temperature sensors in the printer.

The ten coefficients $C_{i0}$ through $C_{i9}$ are found empirically, by a process to be explained in subsection 3 below, and embody the sensitivity data 34. (It will now be clear why the term "coefficients" appears in block 34 of the diagram.) This representative computation is made more complicated arithmetically—but not conceptually—if the system is to take into account additional variables such as atmospheric pressure P, pen age, media type or color, and so forth.

It will be understood that another subscript could be added to account for the fact that each output level is for a particular point P2 or P3 and a particular ink. Thus in the preferred embodiment of my invention, there are four inks including black, and therefore four each of $OL_1$, and $OL_2$ polynomials as shown above—for a total of eight polynomials in all (excluding the preparations for ink limiting), to establish the transfer functions. The added color-identification subscripts—as for instance in presentation of the output level "$OL_{i\text{-}magenta}$"—may be regarded as implicit.

For the embodiment of my invention which is now most highly preferred, the values of the ten coefficients $C_{i0}$ through $C_{i9}$ appear in Table 1. This tabulation shows all the calibration coefficients (CC) for the indicated five types of printing medium, for two resolutions, for color calibration for four different pens, and also automatic ink limiting (AIL) coefficients, discussed below.

Implementation of the color-adjustment aspects of my invention through the PostScript system is particularly straightforward using the previously mentioned transfer-function capability of that printer language. These aspects of the invention can also be incorporated into an update of the HP-GL/2 system, but a greater effort is required because as noted earlier that system provides no transfer-function feature.

3. Calculation of the Transfer Function Coefficients

The structure and operation of the run-time aspects of my invention are essentially independent of the procedure by which the transfer-function coefficients are calculated. Described below is the coefficient-calculation procedure which I have employed and which I prefer.

Operation of the run-time part of the invention is based on LUTs, for each ink, that provide the actual ink intensity values which are best for color reproduction under the current environmental and operational conditions (typically temperature, humidity and drop weight). I prefer to use a statistical multiple regression to adjust the polynomial that predicts those ink values.

The regression is calculated from one hundred data points, each representing an ink intensity value that has minimum difference in color coordinates to neutral gray for a given combination of the environmental and operational conditions. Those one hundred data points are generated as follows.

Figure 4:
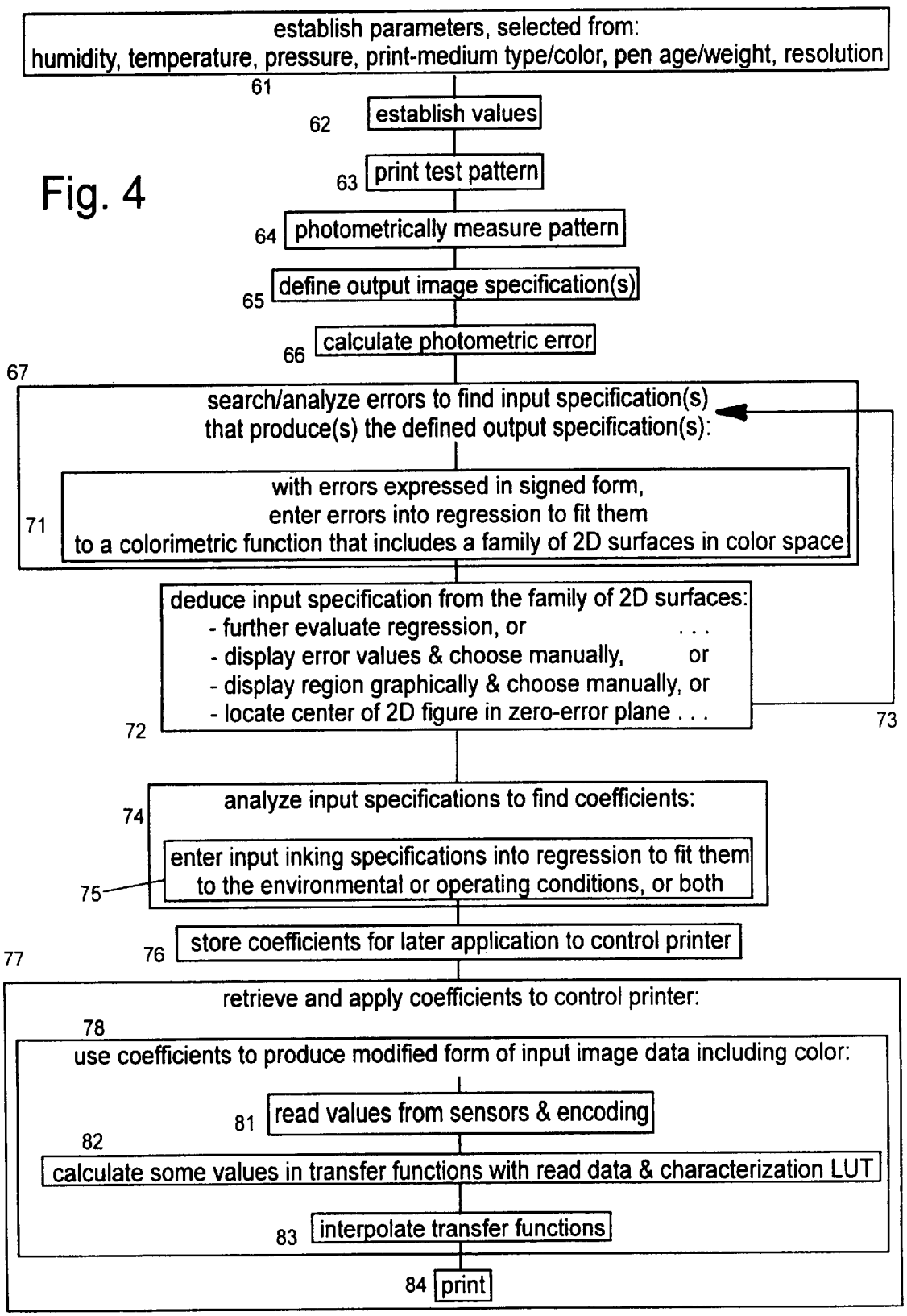
FIG. 4 is a flow chart showing operations for both calculation of transfer-function coefficients and use of the coefficients to print consistent color.

Three levels of relative humidity (twenty, fifty and eighty percent) are crosscombined with three temperatures (fifteen, twenty-five and thirty-five degrees Celsius), to provide nine sets of environmental conditions. To these is added one more set, namely sixty-five percent humidity at thirty degrees Celsius, for a total of ten conditions 61, 62 (FIG. 4). These ten sets are crosscombined with five different drop-weight levels (nominal, and plus-or-minus ten and twenty percent) for a total of fifty test-pattern conditions.

Figure 2:
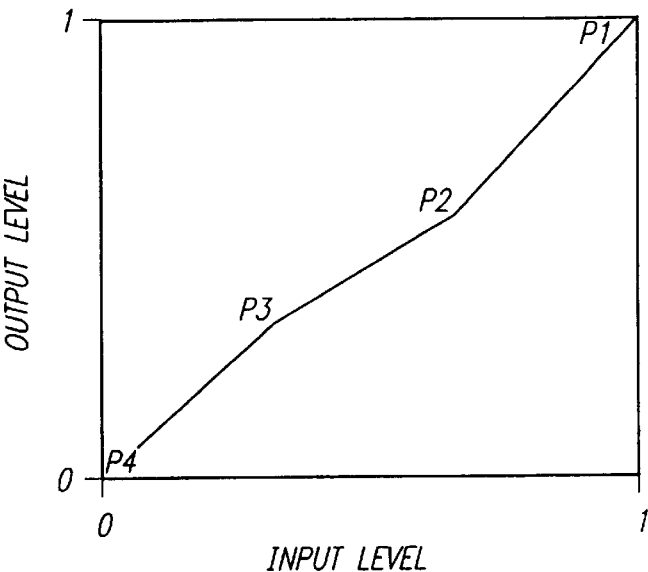
FIG. 2 is a graph of output and input relationships incorporated into a transfer function for one representative ink.
Figure 3:
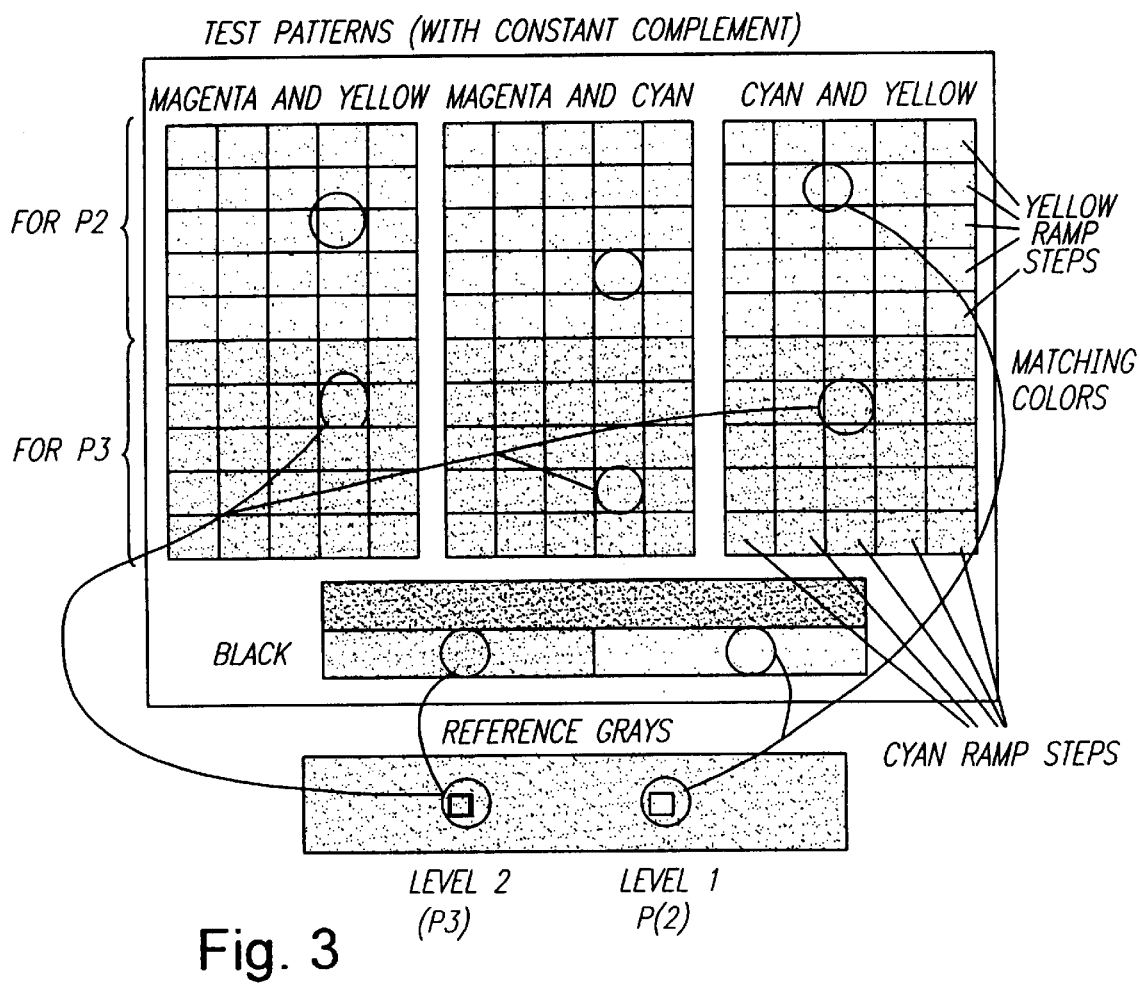
FIG. 3 is a very schematic representation of a color test pattern used in calculation of coefficients for operation of the FIG. 1 system.

I print 63 fifty test patterns, under all those conditions respectively. Each test pattern consists of further crosscombinations of ramp steps (FIG. 3) in paired inks—e. g. magenta and yellow, laid down in combination with a constant level of the complement, e. g. cyan for the magenta and yellow pair. Each test pattern is actually doubled, with different color intensities, so that a separate set of values is obtained for each of the points P2 and P3 in the correponding transfer-function graph (FIG. 2). Next, I photometrically measure 64 the results and with certain output image specifications in mind 65 I calculate 66 the photometric errors as between the measured results and the assumed output specifications.

I then search 67 the measured values for the two reference grays—the ordinate values of P2 and P3 in the transfer-function graph (FIG. 2). In this way I find the ink intensity values, or in other words the abscissa values (of the same two points P2, P3), that best reproduce those two target gray values.

To perform this search 67 I prefer to conduct a preliminary statistical analysis, a first regression-line calculation 71—in which the drop weight for each color, and the temperature and humidity etc., are treated as independent variables. In this preliminary analysis the four ink levels sought are the dependent variables.

Since each of the fifty test patterns is searched to find two ink intensity values, the output of this preliminary stage is one hundred data points as mentioned above: a small sampling is in Table 2. (I refer here to the fact that each crosscombination of colors occurs in two different parts of the test pattern, not to the fact that two output values, P2 and P3 for respectively, are sought.)

The regression 71 does not lead completely to the desired point for each crosscombination of conditions. Rather, as suggested representatively in FIG. 5 each regression may instead be used to lead to determination of a line 72$ym$ (for yellow and magenta) which is the intersection of a two-dimensional surface 71 with the zero-error Y-M plane for some one of three perceptual color variables, e. g. $\Delta L$—in a special three-dimensional calculation space YM $\Delta L$.

As shown, the three-dimensional calculation space has these three orthogonal variables: two varying inks (in the illustrated example, namely yellow Y and magenta M), and colorimetric error in one of three perceptual color dimensions (in the illustrated example, namely error $\Delta L$ in lightness). The other calculation spaces used are YM$\Delta a^*$, YM$\Delta b^*$ (Here the errors are $\Delta a^*$ and $\Delta b^*$ in the well-known CIE variables $a^*$ and $b^*$, both of which are mathematically related to hue and saturation.); YC$\Delta L$, YC$\Delta a^*$, YC$\Delta b^*$; CM$\Delta L$, CM$\Delta a^*$ and CM$\Delta b^*$.

The two-dimensional surface 71 corresponds to the photometric values found for the crosscombinations of colors in one test pattern. In the drawing these color combinations are symbolized by the nodes of the illustrated grid, and as can be seen part of this array of data points falls below the zero-error Y-M plane.

A like curve-plane intersection line 72$yma$, 72$ymb$ (FIG. 6)—or other convenient representation of the behavior of the three two-dimensional surfaces similar to the surface 71 in FIG. 5—is similarly located for the other color-space perceptual dimensions, using the first two of the other calculation spaces listed above. A single point now must be deduced 72 from these intersection lines or other desired representations.

If three intersection lines with the zero-error plane have been found, as suggested in FIG. 6, then one suitable tactic for finding the desired input-specification point is simply to locate the center 72 of the triangle defined in that plane. Other approaches which will straightforwardly locate a minimum overall error, though not generally in the zero-error plane, include:

further evaluating the regressions to find the best point, considering all the curves simultaneously;

displaying the error values numerically in the region of the FIG. 6 intersection lines—but not only in the zero-error plane—and choosing a point manually by a visual search for points with all three error values small and roughly equal; or similarly displaying the region but with the error values represented graphically, and choosing a point manually by a visual search for points with all three error surfaces roughly equidistant from—but close to, if not in—the zero-error plane.

These latter approaches (also described earlier in the "Summary of the Disclosure" section) are facilitated greatly by use of a high-level statistical package such as that known commercially as "e-chip".

The search steps 67, 71, 72 to this point are iterated 73 with other regressions to obtain analogous surfaces and intersections for the other varied color pairs. The last six calculation spaces listed above are for use in these calculations.

Next I analyze 74 these hundred resulting abscissa values—for the parameter crosscombinations—to obtain for each ink the coefficients $C_{i0}$ through $C_{i9}$. Those are the coefficients that appear symbolically in the expression set forth earlier for the output level $OL_i$ and whose numerical values are exhibited in Table 1. I prefer to perform this step by using a second, final regression-line calculation 75.

In this way each regression provides, for a corresponding one of the inks, the polynomial function that predicts the ink intensities required to print the reference color properly with given drop weight and environmental conditions. As an example of the result of one regression, for cyan level 1:

$$OL_{1\text{-}cyan} = 0.66218 - 0.00454DW - 0.00112RH + 0.00185T + 0.00090(DW)^2 - 4.4 \cdot 10^{-6}(RH)^2 + 4.35 \cdot 10^{-5}T^2 + 5.72 \cdot 10^{-5}(DW)(RH) - 0.00038(RH)T + 2.05 \cdot 10^{-5}(DW)T$$

The process should be performed for each different type of printing medium, and each print resolution—generally as suggested by the layout of Table 1. It should also be performed for each dither pattern, error-diffusion mode or other major operating mode for which independent optimization of the system is desired.

The coefficients are next stored 76 for later use 77 in controlling the printer. Such use is then very rapid and straightforward, including application 78 of the coefficients to calculate the LUTs 51, and reference to those LUTs to produce a modified form 52 of the input image data 41, 45 as described earlier.

Preferably that application 78 includes reading 81 the values from the sensors—and from encoded values in the pen or other colorant-applying module, and if desired from encoded values 16, 17 in the printing medium 47. Next is a calculation 82 of some values in the transfer functions, using the read data and the complete characterization LUT 34.

An interpolation 83 of the transfer functions follows, and finally a printout 84 of the image. These several steps are done generally as described in the above discussion of the run-time structure and operation of my invention.

4. AUTOMATIC INK LIMITING

This topic is a part of my invention because I have recognized that printing-medium absorption ability, too, varies with environmental conditions. Ink limiting therefore can be better managed by taking environmental conditions into account, through an analog of my color-calibration techniques.

Ink limiting reduces excess ink in secondaries and dark colors, especially when printing composite black. It thereby allows better print quality and (by virtue of shorter drying time) faster printing.

Automatic ink limiting (AIL) controls the amount of such excess-ink reduction in a newly rational way, namely according to real drop weight and environmental conditions. These are factors that greatly affect how much ink a particular printing medium can accommodate.

AIL is applied, using a firmware-generated LUT, to contone or twenty-four-bit RGB data before rendition 57 (and scaling, if any)—but after all color-calibration procedures 42, 51. AIL clips the total amount of ink to a single-value limit by reducing cyan, magenta and yellow in equal proportions; black is not reduced.

AIL works very similarly to the color calibration techniques described above, and can be used in the HP-GL/2 system as well as the PostScript system. There is an operational difference in that HP-GL/2 applies AIL only with media that require composite black—i. e., only with glossy media. PostScript, by comparison, can use up to four hundred percent of ink in all media, and therefore requires ink limiting always. AIL is urgent enough that some printer-language products have been specially modified just to perform environmentally-controlled AIL—on glossy media only.

In the currently preferred PostScript implementation, two parameters "low" and "limit" (FIG. 7) are received from the firmware. In HP-GL/2, a LUT with 756 values is received instead, these values representing the inking reduction to be applied to each C, M and Y value as a function of their sum.

For faster processing, the reduction factors are bytes (255 is treated as equivalent to multiplication by unity). The LUT is calculated from two values (here too "low" and "limit") by doing the calculation indicated in the lower portion of FIG. 7, in which "i" represents the C+M+Y sum, and low and limit are percent coverages, calculated using a polynomial function with ten parameters.

The function then has the same appearance as that given earlier for $OL_i$—but the calculated value may be identified as "limit" rather than $Ol_i$. The same environmental and operational inputs 25–29 are used for AIL adjustments—and the portions of FIG. 1 showing collection of those data and computation 31 of LUTs stand equally well as illustration of the AIL preparations.

Actual resulting values of AIL coefficients in the now-preferred embodiment of the invention are included in Table 1. The scale range for PostScript goes to three hundred percent for glossy media (since true black ink is not used), and to four hundred percent for other media.

The above disclosure is intended as merely exemplary, and not to limit the scope of the invention—which is to be determined by reference to the appended claims.

TABLE 1

| Media type | Res | Purpose | Ink | Point | C0 C+ | C1 DW+ | C2 RH+ | C3 T+ | C4 DW^2+ | C5 RH^2+ |
|---|---|---|---|---|---|---|---|---|---|---|
| bond | 600 | cc | c | P2 | 0.6621853 | −0.004542 | −0.00111681 | 0.0018517 | 0.0009063 | −4.40767E−06 |
| | | | | P3 | 0.4727139 | −0.02409 | −0.003490511 | 0.0036249 | 0.0021369 | 1.52558E−05 |
| | | | | P4 | 0 | 0 | 0 | 0 | 0 | 0 |
| | | | m | P2 | 0.3760328 | 0.0348522 | −0.000151967 | 0.0040687 | −0.000752 | −3.86766E−06 |
| | | | | P3 | −0.205558 | 0.0756778 | −0.000879702 | 0.0036094 | −0.001976 | 1.14945E−05 |
| | | | | P4 | 0 | 0 | 0 | 0 | 0 | 0 |
| | | | y | P2 | 0.7260346 | −0.018512 | −0.001000389 | 0.0037551 | 0.0015291 | 6.20605E−06 |
| | | | | P3 | 0.573208 | −0.058801 | −0.01887514 | 0.0104023 | 0.0037737 | 2.42386E−06 |
| | | | | P4 | 0 | 0 | 0 | 0 | 0 | 0 |
| | | | k | P2 | 0.6250161 | −0.07163 | 0.000682183 | 0.0062857 | 0.000202 | −2.25154E−05 |
| | | | | P3 | 0.5936054 | −0.02082 | 3.93233E−05 | 0.0052475 | 0.0004261 | −2.77322E−05 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |
| vellum | 600 | cc | c | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | m | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | y | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | k | P2 | 0.66 | 0 | 0 | 0 | 0 | 0 |
| | | | | P3 | 0.33 | 0 | 0 | 0 | 0 | 0 |

TABLE 1-continued

| | | | | | | | | | | |
|---|---|---|---|---|---|---|---|---|---|---|
| | | all | avg | P4 | 0 | 0 | 0 | 0 | 0 | 0 |
| | | | | low | 0.295238 | 0.0928572 | 0 | 0 | −0.005952 | 0 |
| | | | | limit | 0.875 | −0.025 | 0 | 0 | 0 | 0 |
| glossy | 600 | cc | c | P2 | 0.6749769 | −0.015049 | 0.00066015 | 0.00321 | 0.0012865 | 2.88281E-06 |
| | | | | P3 | 0.299849 | −0.011761 | 0.001089054 | 0.0055156 | 0.0017066 | −2.20044E-05 |
| | | | | P4 | 0 | 0 | 0 | 0 | 0 | 0 |
| | | | m | P2 | 0.4466057 | 0.0124937 | 0.001188615 | 0.0081195 | 0.0003086 | −2.26638E-06 |
| | | | | P3 | −0.310609 | 0.1005739 | 0.000905888 | −0.002198 | −0.002955 | −2.59964E-05 |
| | | | | P4 | 0 | 0 | 0 | 0 | 0 | 0 |
| | | | y | P2 | 0.6209412 | −0.000801 | −4.19334E-05 | 0.0020514 | 0.0001434 | 5.16172E-06 |
| | | | | P3 | 0.3026994 | −0.002229 | −0.000843377 | 0.00793934 | 0.0002123 | 2.59104E-07 |
| | | | | P4 | 0 | 0 | 0 | 0 | 0 | 0 |
| | | | k | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | all | avg | low | 2.2860306 | −0.264511 | −0.001847186 | −0.005445 | 0.0085493 | −2.04941E-05 |
| | | | | limit | 1.4394357 | −0.094649 | 0.003450749 | −0.003666 | 0.0027504 | −3.23098E-05 |
| matte | 600 | cc | c | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | m | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | y | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | k | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |
| coated | 600 | cc | c | P2 | 0.6174316 | −0.013157 | 0.000979426 | 0.00224 | 0.0016394 | 1.19577E-05 |
| | | | | P3 | 0.2781502 | −0.016901 | 0.001034836 | 0.0030355 | 0.0021637 | −1.38253E-06 |
| | | | | P4 | −0.10185 | −0.016901 | 0.001034836 | 0.0030355 | 0.0021637 | −1.38253E-06 |
| | | | m | P2 | 0.3507075 | 0.0248477 | 0.001259327 | 0.0045462 | −9.81E-05 | −1.67377E-07 |
| | | | | P3 | −0.066347 | 0.0423648 | −1.66497E-05 | 0.0045537 | −0.000483 | 2.43628E-06 |
| | | | | P4 | −0.446347 | 0.0423648 | −1.66497E-05 | 0.0045537 | −0.000483 | 2.43628E-06 |
| | | | y | P2 | 0.4701565 | 0.0253136 | −2.10792E-05 | 0.0009219 | −0.000345 | 1.10081E-06 |
| | | | | P3 | 0.0255217 | 0.0413963 | 9.50369E-05 | 0.0043631 | −0.000651 | −4.98955E-06 |
| | | | | P4 | −0.354478 | 0.0413963 | 9.50369E-05 | 0.0043631 | −0.000651 | −4.98955E-06 |
| | | | k | P2 | 0.9292559 | −0.014327 | −0.002454262 | 0.0013182 | 0.0002748 | −3.60975E-07 |
| | | | | P3 | 0.7629206 | −0.02056 | −0.002234357 | −0.003178 | 0.0004007 | 1.01735E-05 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |
| bond | 300 | cc | c | P2 | 0.6621853 | −0.004542 | −0.00111681 | 0.0018517 | 0.0009063 | −4.40767E-06 |
| | | | | P3 | 0.427139 | −0.02409 | −0.003490511 | 0.0036249 | 0.0021369 | 1.52558E-05 |
| | | | | P4 | 0 | 0 | 0 | 0 | 0 | 0 |
| | | | m | P2 | 0.3760328 | 0.0348522 | −0.000151967 | 0.0040687 | −0.000752 | −3.86766E-06 |
| | | | | P3 | −0.205558 | 0.0756778 | −0.000879702 | 0.0036094 | −0.001976 | 1.14945E-05 |
| | | | | P4 | 0 | 0 | 0 | 0 | 0 | 0 |
| | | | y | P2 | 0.7260346 | −0.018512 | −0.001000389 | 0.0037551 | 0.0015291 | 6.20605E-06 |
| | | | | P3 | 0.573208 | −0.058801 | −0.001887514 | 0.0104023 | 0.0037737 | 2.42386E-05 |
| | | | | P4 | 0 | 0 | 0 | 0 | 0 | 0 |
| | | | k | P2 | 0.6250161 | −0.007163 | 0.000682183 | 0.0062857 | 0.000202 | −2.25154E-05 |
| | | | | P3 | 0.5936054 | −0.02082 | 3.93233E-05 | 0.0052475 | 0.0004261 | −2.77322E-05 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |
| vellum | 300 | cc | c | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | m | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | y | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | k | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |
| glossy | 300 | cc | c | P2 | 0.6749769 | −0.015049 | 0.00066015 | 0.00321 | 0.0012865 | 2.88281E-06 |
| | | | | P3 | 0.299849 | −0.011761 | 0.001089054 | 0.0055156 | 0.0017066 | −2.2044E-05 |
| | | | | P4 | 0 | 0 | 0 | 0 | 0 | 0 |
| | | | m | P2 | 0.4466057 | 0.0124937 | 0.001188615 | 0.0081195 | 0.0003086 | −2.44864E-05 |
| | | | | P3 | −0.310609 | 0.1005739 | 0.000905888 | −0.002198 | −0.002955 | −2.59964E-05 |
| | | | | P4 | 0 | 0 | 0 | 0 | 0 | 0 |

TABLE 1-continued

| Media type | Res | Purpose | Ink | Point | | | | | | |
|---|---|---|---|---|---|---|---|---|---|---|
| | | | y | P2 | 0.6209412 | −0.000801 | −4.19334E-05 | 0.0020514 | 0.0001434 | 5.16172E-06 |
| | | | | P3 | 0.3026994 | −0.002229 | −0.000843377 | 0.0073934 | 0.0002123 | 2.59104E-07 |
| | | | | P4 | 0 | 0 | 0 | 0 | 0 | 0 |
| | | | k | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | all | avg | low | 2.2860306 | −0.264511 | −0.001847186 | −0.005445 | 0.0085493 | −2.04941E-05 |
| | | | | limit | 1.4394357 | −0.094649 | 0.003450749 | −0.003666 | 0.0027504 | −3.23098E-05 |
| matte | 300 | cc | c | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | m | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | y | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | | k | P2 | 0.66 | 0 | 0 | 0 | 0 | 0 |
| | | | | P3 | 0.33 | 0 | 0 | 0 | 0 | 0 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |
| coated | 300 | cc | c | P2 | 0.6174316 | −0.013157 | 0.000979426 | 0.00224 | 0.0016394 | 1.19577E-05 |
| | | | | P3 | 0.2781502 | −0.016901 | 0.001034836 | 0.0030355 | 0.0021637 | −1.38253E-06 |
| | | | | P4 | −0.10185 | −0.016901 | 0.001034836 | 0.0030355 | 0.0021637 | −1.38253E-06 |
| | | | m | P2 | 0.3507075 | 0.0248477 | 0.001259327 | 0.0045462 | −9.81E-05 | −1.67377E-07 |
| | | | | P3 | −0.066347 | 0.0423648 | −1.66497E-05 | 0.0045537 | −0.000483 | 2.43628E-06 |
| | | | | P4 | −0.446347 | 0.0423648 | −1.66497E-05 | 0.0045537 | −0.000483 | 2.43628E-06 |
| | | | y | P2 | 0.4701565 | 0.0253136 | −2.10792E-05 | 0.0009219 | −0.000345 | 1.10081E-06 |
| | | | | P3 | 0.0255217 | 0.0413963 | 9.50369E-05 | 0.0043631 | −0.000651 | −4.98955E-06 |
| | | | | P4 | −0.354478 | 0.0413963 | 9.50369E-05 | 0.0043631 | −0.000651 | −4.98955E-06 |
| | | | k | P2 | 0.9292559 | −0.14327 | −0.002454262 | 0.0013182 | 0.0002748 | −3.60975E-07 |
| | | | | P3 | 0.7629206 | −0.02056 | −0.002234357 | −0.003178 | 0.0004007 | 1.01735E-05 |
| | | | | P4 | 0 | 0 | 0 | 0 | 0 | 0 |
| | | all | avg | low | 0.295238 | 0.0928572 | 0 | 0 | −0.005952 | 0 |
| | | | | limit | 0.875 | −0.025 | 0 | 0 | 0 | 0 |

| Media type | Res | Purpose | Ink | Point | C6 $T^2{}^+$ | C7 $DW^+RH^+$ | C9 $DW*T^+$ | C8 $RH*T$ |
|---|---|---|---|---|---|---|---|---|
| bond | 600 | cc | c | P2 | 4.35243E-05 | 5.71979E-05 | −0.000381901 | 2.04706E-05 |
| | | | | P3 | 8.255E-05 | 8.53272E-05 | −0.000628802 | 3.31965E-05 |
| | | | | P4 | 0 | 0 | 0 | 0 |
| | | | m | P2 | 3.62105E-05 | −6.35852E-06 | −0.000300281 | 2.21142E-05 |
| | | | | P3 | 4.56224E-05 | −4.9313E-05 | −0.000386359 | 3.02687E-05 |
| | | | | P4 | 0 | 0 | 0 | 0 |
| | | | y | P2 | 3.18525E-05 | −9.26465E-06 | −0.000440102 | 2.58566E-05 |
| | | | | P3 | 3.502E-05 | −5.28504E-05 | −0.000842866 | 2.74006E-05 |
| | | | | P4 | 0 | 0 | 0 | 0 |
| | | | k | P2 | −1.47696E-05 | 1.77566E-05 | −0.000135061 | 1.64334E-05 |
| | | | | P3 | 4.78359E-06 | 1.98575E-05 | −0.000169491 | 4.94723E-05 |
| | | | | P4 | 0 | 0 | 0 | 0 |
| | | all | avg | low | 0 | 0 | 0 | 0 |
| | | | | limit | 0 | 0 | 0 | 0 |
| vellum | 600 | cc | c | P2 | 0 | 0 | 0 | 0 |
| | | | | P3 | 0 | 0 | 0 | 0 |
| | | | | P4 | 0 | 0 | 0 | 0 |
| | | | m | P2 | 0 | 0 | 0 | 0 |
| | | | | P3 | 0 | 0 | 0 | 0 |
| | | | | P4 | 0 | 0 | 0 | 0 |
| | | | y | P2 | 0 | 0 | 0 | 0 |
| | | | | P3 | 0 | 0 | 0 | 0 |
| | | | | P4 | 0 | 0 | 0 | 0 |
| | | | k | P2 | 0 | 0 | 0 | 0 |
| | | | | P3 | 0 | 0 | 0 | 0 |
| | | | | P4 | 0 | 0 | 0 | 0 |
| | | all | avg | low | 0 | 0 | 0 | 0 |
| | | | | limit | 0 | 0 | 0 | 0 |
| glossy | 600 | cc | c | P2 | −1.32647E-05 | −2.34581E-05 | −9.40368E-05 | −3.11568E-05 |
| | | | | P3 | 4.07462E-06 | 7.70893E-05 | −0.000548328 | 2.85127E-05 |
| | | | | P4 | 0 | 0 | 0 | 0 |
| | | | m | P2 | −2.44864E-05 | −3.43057E-05 | −0.00046392 | 2.99657E-05 |
| | | | | P3 | 0.000128193 | 7.88514E-05 | −0.000497047 | 6.57969E-05 |
| | | | | P4 | 0 | 0 | 0 | 0 |
| | | | y | P2 | −5.31068E-05 | 1.3434E-06 | 0.000155835 | −8.55365E-06 |
| | | | | P3 | −0.000159461 | 7.15775E-05 | 0.000108329 | 2.37593E-05 |
| | | | | P4 | 0 | 0 | 0 | 0 |
| | | | k | P2 | 0 | 0 | | |
| | | | | P3 | 0 | 0 | | |

TABLE 1-continued

| | | | | | | | | |
|---|---|---|---|---|---|---|---|---|
| | | | | P4 | 0 | 0 | 0 | 0 |
| | | all | avg | low | 0 | 0.000412227 | 0.000943834 | −6.24083E-05 |
| | | | | limit | 0 | 4.32893E-05 | 0.000424524 | −5.86619E-05 |
| matte | 600 | cc | c | P2 | 0 | 0 | 0 | 0 |
| | | | | P3 | 0 | 0 | 0 | 0 |
| | | | | P4 | 0 | 0 | 0 | 0 |
| | | | m | P2 | 0 | 0 | 0 | 0 |
| | | | | P3 | 0 | 0 | 0 | 0 |
| | | | | P4 | 0 | 0 | 0 | 0 |
| | | | y | P2 | 0 | 0 | 0 | 0 |
| | | | | P3 | 0 | 0 | 0 | 0 |
| | | | | P4 | 0 | 0 | 0 | 0 |
| | | | k | P2 | 0 | 0 | 0 | 0 |
| | | | | P3 | 0 | 0 | 0 | 0 |
| | | | | P4 | 0 | 0 | 0 | 0 |
| | | all | avg | low | 0 | 0 | 0 | 0 |
| | | | | limit | 0 | 0 | 0 | 0 |
| coated | 600 | cc | c | P2 | 1.79698E-05 | −0.000139804 | −0.000223612 | 8.77211E-09 |
| | | | | P3 | 2.03518E-05 | −3.17779E-05 | −0.000278258 | 1.99287E-06 |
| | | | | P4 | 2.03518E-05 | −3.17779E-05 | −0.000278258 | 1.99287E-06 |
| | | | m | P2 | −1.36992E-05 | −5.69825E-05 | −0.000203997 | −1.38809E-05 |
| | | | | P3 | −5.51875E-06 | −1.13792E-05 | −0.000268849 | 7.34958E-06 |
| | | | | P4 | −5.51875E-06 | −1.13792E-05 | −0.000268849 | 7.34958E-06 |
| | | | y | P2 | 2.38501E-05 | −3.40319E-06 | −0.0002116 | 1.34198E-05 |
| | | | | P3 | 1.41021E-05 | 3.36499E-05 | −0.000435898 | 1.04615E-05 |
| | | | | P4 | 1.41021E-05 | 3.36499E-05 | −0.000435898 | 1.04615E-05 |
| | | | k | P2 | −0.000107171 | −3.03467E-05 | −5.91655E-06 | 0.000128844 |
| | | | | P3 | −9.32439E-05 | −8.60859E-05 | 6.57401E-05 | 0.00016458 |
| | | | | P4 | 0 | 0 | 0 | 0 |
| | | all | avg | low | 0 | 0 | 0 | 0 |
| | | | | limit | 0 | 0 | 0 | 0 |
| bond | 300 | cc | c | P2 | 4.35243E-05 | 5.71979E-05 | −0.000381901 | 2.04706E-05 |
| | | | | P3 | 8.255E-05 | 8.53272E-05 | −0.000628802 | 3.31965E-05 |
| | | | | P4 | 0 | 0 | 0 | 0 |
| | | | m | P2 | −3.62104E-06 | −6.35852E-06 | −0.000300281 | 2.21142E-05 |
| | | | | P3 | 4.56224E-05 | −4.9313E-05 | −0.000386359 | 3.02687E-05 |
| | | | | P4 | 0 | 0 | 0 | 0 |
| | | | y | P2 | 3.18525E-05 | −9.26465E-06 | −0.000440102 | 2.58566E-05 |
| | | | | P3 | 3.502E-05 | −5.28504E-05 | −0.000842866 | 2.74006E-05 |
| | | | | P4 | 0 | 0 | 0 | 0 |
| | | | k | P2 | −1.47696E-05 | 1.77566E-05 | −0.000135061 | 1.64334E-05 |
| | | | | P3 | 4.78359E-06 | 1.98575E-05 | −0.000169491 | 4.94723E-05 |
| | | | | P4 | 0 | 0 | 0 | 0 |
| | | all | avg | low | 0 | 0 | 0 | 0 |
| | | | | limit | 0 | 0 | 0 | 0 |
| vellum | 300 | cc | c | P2 | 0 | 0 | 0 | 0 |
| | | | | P3 | 0 | 0 | 0 | 0 |
| | | | | P4 | 0 | 0 | 0 | 0 |
| | | | m | P2 | 0 | 0 | 0 | 0 |
| | | | | P3 | 0 | 0 | 0 | 0 |
| | | | | P4 | 0 | 0 | 0 | 0 |
| | | | y | P2 | 0 | 0 | 0 | 0 |
| | | | | P3 | 0 | 0 | 0 | 0 |
| | | | | P4 | 0 | 0 | 0 | 0 |
| | | | k | P2 | 0 | 0 | 0 | 0 |
| | | | | P3 | 0 | 0 | 0 | 0 |
| | | | | P4 | 0 | 0 | 0 | 0 |
| | | all | avg | low | 0 | 0 | 0 | 0 |
| | | | | limit | 0 | 0 | 0 | 0 |
| glossy | 300 | cc | c | P2 | −1.32647E-05 | −2.34581E-05 | −9.40368E-05 | −3.11568E-05 |
| | | | | P3 | 4.07462E-06 | 7.70893E-05 | −0.000548328 | 2.85127E-05 |
| | | | | P4 | 0 | 0 | 0 | 0 |
| | | | m | P2 | −2.44864E-05 | −3.34057E-05 | −0.00046392 | 2.99657E-06 |
| | | | | P3 | 0.000128193E-05 | 7.88514E-05 | −0.000497047 | 6.57969E-05 |
| | | | | P4 | 0 | 0 | 0 | 0 |
| | | | y | P2 | −5.31068E-05 | 1.13434E-06 | 0.000155835 | −8.55365E-06 |
| | | | | P3 | −0.000159461 | 7.15775E-05 | 0.000108329 | −5.86619E-05 |
| | | | | P4 | 0 | 0 | 0 | 0 |
| | | | k | P2 | 0 | 0 | 0 | 0 |
| | | | | P3 | 0 | 0 | 0 | 0 |
| | | | | P4 | 0 | 0 | 0 | 0 |
| | | all | avg | low | 0 | 0.000412227 | 0.000943834 | −6.24083E-05 |
| | | | | limit | 0 | 4.32893E-05 | 0.000424524 | −5.86619E-05 |
| matte | 300 | cc | c | P2 | 0 | 0 | 0 | 0 |
| | | | | P3 | 0 | 0 | 0 | 0 |
| | | | | P4 | 0 | 0 | 0 | 0 |
| | | | m | P2 | 0 | 0 | 0 | 0 |
| | | | | P3 | 0 | 0 | 0 | 0 |
| | | | | P4 | 0 | 0 | 0 | 0 |

TABLE 1-continued

| | | | | | | | | |
|---|---|---|---|---|---|---|---|---|
| | | | | y | P2 | 0 | 0 | 0 | 0 |
| | | | | | P3 | 0 | 0 | 0 | 0 |
| | | | | | P4 | 0 | 0 | 0 | 0 |
| | | | | k | P2 | 0 | 0 | 0 | 0 |
| | | | | | P3 | 0 | 0 | 0 | 0 |
| | | | | | P4 | 0 | 0 | 0 | 0 |
| | | | all | avg | low limit | 0 0 | 0 0 | 0 0 | 0 0 |
| coated | 300 | cc | c | | P2 | 1.79698E-05 | −0.000139804 | −0.000223612 | 8.77211E-09 |
| | | | | | P3 | 2.03518E-05 | −3.17779E-05 | −0.000278258 | 1.99287E-06 |
| | | | | | P4 | 2.03518E-05 | −3.17779E-05 | −0.000278258 | 1.99287E-06 |
| | | | | m | P2 | −1.36992E-05 | −5.69825E-05 | −0.000203997 | −1.38809E-05 |
| | | | | | P3 | −5.51875E-06 | −1.13792E-05 | −0.000268849 | 7.34958E-06 |
| | | | | | P4 | −5.51875E-06 | −1.13792E-05 | −0.000268849 | 7.34958E-06 |
| | | | | y | P2 | 2.38501E-05 | −3.40319E-06 | −0.0002116 | 1.34198E-05 |
| | | | | | P3 | 1.41021E-05 | 3.36499E-05 | −0.000435898 | 1.04615E-05 |
| | | | | | P4 | 1.41021E-05 | 3.36499E-05 | −0.000435898 | 1.04615E-05 |
| | | | | k | P2 | −0.000107171 | −3.03467E-05 | −5.91655E-06 | 0.000128844 |
| | | | | | P3 | −9.32439E-05 | −8.60859E-05 | 6.57401E-05 | 0.00016458 |
| | | | | | P4 | 0 | 0 | 0 | 0 |
| | | | all | avg | low limit | 0 0 | 0 0 | 0 0 | 0 0 |

TABLE 2

| DW int | RH | T | ink |
|---|---|---|---|
| cyan level 1 | | | |
| 13.2 | 80 | 25 | 0.63 |
| 12 | 50 | 35 | 0.68 |
| 10.8 | 50 | 15 | 0.59 |
| 14.4 | 20 | 25 | 0.76 |
| 12 | 20 | 35 | 0.68 |
| ... | | | |
| cyan level 2 | | | |
| 12 | 80 | 25 | 0.44 |
| 13.2 | 50 | 35 | 0.42 |
| 10.8 | 50 | 15 | 0.38 |
| 12 | 20 | 25 | 0.41 |
| 14.4 | 20 | 35 | 0.45 |
| ... | | | |
| yellow level 1 | | | |
| 12 | 80 | 25 | 0.64 |
| 13.2 | 50 | 35 | 0.62 |
| 10.8 | 50 | 15 | 0.58 |
| 12 | 20 | 25 | 0.71 |
| 14.4 | 20 | 35 | 0.65 |
| ... | | | |
| black level 1 | | | |
| 13.2 | 80 | 25 | 0.63 |
| 13.2 | 50 | 35 | 0.61 |
| 12 | 50 | 15 | 0.59 |
| 12 | 20 | 25 | 0.75 |
| 10.8 | 20 | 35 | 0.60 |
| ... | | | |
| magenta level 1 | | | |
| 12 | 80 | 25 | 0.61 |
| 12 | 50 | 35 | 0.60 |
| 14.4 | 50 | 15 | 0.55 |
| 10.8 | 20 | 25 | 0.70 |
| 14.4 | 20 | 35 | 0.69 |
| ... | | | |
| ... | | | |
| ... | | | |

I claim:

1. A method of operating an incremental printer, with a printing medium; said method comprising the steps of:

automatically sensing, immediately before printing, at least one environmental condition that affects color, including color accuracy and color consistency, of a printed image; and then automatically compensating specifically for effects of the at least one environmental condition on color by using the sensed at least one environmental condition to modify operation of the printer;

wherein the compensating step comprises evaluating a mathematical expression that explicitly includes representations of color signals in the printer and of the at least one sensed environmental condition.

2. The method of claim 1, wherein:

the using step is also in accordance with a color calibration profile that is not prepared immediately before printing.

3. The method of claim 1, wherein:

the at least one environmental condition comprises plural environmental conditions that each affect color; and the compensating step comprises explicitly calculating effects of each of the sensed environmental conditions, considered both individually and in combination.

4. The method of claim 3, wherein:

said calculating effects of conditions considered individually, facilitates verifying correct response to each of the sensed environmental conditions considered individually.

5. The method of claim 1, wherein:

the mathematical expression is in closed form.

6. The method of claim 5, wherein:

the mathematical expression comprises coefficients developed iteratively.

7. The method of claim 1, wherein:

the mathematical expression comprises coefficients developed through explicit iterative analysis of cross-combinations of different values of the plural environmental conditions, respectively.

8. The method of claim 1, wherein:

the at least one environmental condition comprises plural environmental conditions that each affect color; and the mathematical expression explicitly includes separate, distinct representations of each of the sensed plural environmental conditions.

9. The method of claim 1, wherein:

the mathematical expression comprises a transfer function.

10. A method of operating an incremental printer, with a printing medium; said method being for use with any particular replaceable colorant-placing module selected from multiple such replaceable modules, said particular replaceable module having a characteristic distinctive property which affects the color of printed images; said method comprising the steps of:

at automatically sensing, immediately before printing, at least one environmental condition that affects color of a printed image;

then automatically using the sensed at least one environmental condition to modify operation of the printer, to compensate specifically for effects of the at least one environmental condition on color;

wherein the using step is also in accordance with a color calibration profile; and automatically using information about the distinctive property of the replaceable module to modify operation of the printer to compensate for effects of the distinctive property on color.

11. A method of operating an incremental printer, with a printing medium that has a sensitivity to excessive deposition of colorant or a carrier thereof; said method comprising the steps of:

automatically sensing, immediately before printing, at least one environmental condition that affects said sensitivity of the medium to excessive deposition of the colorant or carrier; and then automatically using the sensed at least one environmental condition to modify operation of the printer, to limit the amount of colorant deposited and so avoid excessive colorant or carrier deposition;

wherein the using step is in accordance with a color calibration profile that is not prepared immediately before printing.

12. A method of operating an incremental printer, with a printing medium; said method comprising the steps of:

automatically sensing, immediately before printing, at least one environmental condition that affects color of a printed image;

then automatically applying a combination of a principal color calibration with a transfer function, to modify operation of the printer; and automatically using the sensed at least one environmental condition to modify substantially only said transfer function;

whereby the principal calibration is a substantially constant characterization of the printer.

13. The method of claim 12, wherein:

the applying step comprises using a principal calibration that is not prepared immediately before printing.

14. An incremental printer for use with a printing medium and comprising:

means for placing colorant on such medium to form an image;

at least one sensor for sensing at least one environmental condition that affects color of the formed image;

an automatic processor for controlling the placing means to form the image; said processor comprising:

means for automatically operating the at least one sensor immediately before printing, and means for compensating specifically for effects of the at least one environmental condition on color by using the sensed at least one environmental condition to modify said controlling of the placing means;

wherein the compensating means comprise means for evaluating a mathematical expression that explicitly includes representations of color signals in the printer and of the at least one sensed environmental condition.

15. The incremental printer of claim 14, further comprising:

nonvolatile means for holding instructions for automatic operation of the at least one sensor and the processor, including the environmental-condition using means.

16. The incremental printer of claim 14, wherein:

the processor, or an application running in a computer that controls the printer, further comprises means for performing said placing-means controlling in accordance with a color calibration profile that is not prepared immediately before printing.

17. The incremental printer of claim 14, further comprising:

nonvolatile means in the printer, or in said application, for holding the color calibration profile.

18. The incremental printer of claim 14, further comprising:

nonvolatile means for holding a color calibration profile that is loaded into the printer as part of the manufacture of the printer.

19. The incremental printer of claim 14:

wherein the colorant-placing means comprise at least one particular replaceable colorant-placing module selected from multiple such replaceable modules, each replaceable module having at least one respective characteristic distinctive property which affects the color of the formed image;

further comprising means, connected to the processor, for providing to the processor information about the at least one distinctive property of each selected replaceable module;

wherein the processor further comprises means for using the distinctive-property information to modify said controlling to compensate for effects of the at least one distinctive property of each selected replaceable module on color.

20. The incremental printer of claim 19, in the form of an inkjet printer, wherein:

the at least one replaceable module comprises, for each of plural ink colors, a respective scanning multiple-nozzle inkjet pen that ejects inkdrops to form such images;

inkdrops ejected by each pen have a respective drop weight characteristic of that pen, and one said distinctive property is the respective characteristic drop weight for each pen;

the processor controls each pen to eject the inkdrops;

the information-providing means comprise means for informing the processor what the respective drop weight is; and the information-using means comprise means for using the drop-weight information to modify said controlling of each pen to compensate for effects of drop weight on color.

21. The incremental printer of claim 20, wherein:

the processor further comprises means for using the sensed at least one environmental condition and the distinctive-property information together to compensate for interactive effects of the at least one environmental condition and drop weight on color.

22. The incremental printer of claim 19, wherein:
the at least one sensor comprises sensors for sensing plural environmental conditions; and
the processor comprises means for using the plural environmental conditions and the distinctive-property information together to compensate for interactive effects of the plural environmental conditions and the at least one distinctive property, on perceived color.

23. The incremental printer of claim 22, wherein each environmental condition is selected from the group consisting of:
humidity,
pressure, and
temperature.

24. The incremental printer of claim 23, wherein:
each distinctive property is selected from the group consisting of:
the magnitude of a quantized colorant quantity, such as inkdrop weight, to be applied by the replaceable module to such medium, and
age of the replaceable module.

25. The incremental printer of claim 24, further comprising:
means, connected to the processor, for automatically providing to the processor information about at least one other operating condition selected from the group consisting of:
type of such media,
color of such media, and
resolution; and
wherein the processor further comprises means for using said operating-condition information to modify said controlling to compensate for effects of the at least one other operating condition on color.

26. The incremental printer of claim 23, further comprising:
means, connected to the processor, for automatically providing to the processor information about at least one operating condition selected from the group consisting of:
type of such media,
color of such media, and
resolution; and
wherein the processor further comprises means for using said operating-condition information to modify said controlling to compensate for effects of the at least one operating condition on color.

27. The incremental printer of claim 19, wherein:
the information-providing means comprise means associated with each replaceable module for conveying information about the respective distinctive property to the processor.

28. The incremental printer of claim 27, wherein each environmental condition is selected from the group consisting of:
humidity,
pressure, and
temperature.

29. The incremental printer of claim 28, further comprising:
means, connected to the processor, for automatically providing to the processor information about at least one operating condition selected from the group consisting of:
type of such media,
color of such media, and
resolution; and
wherein the processor further comprises means for using said operating-condition information to modify said controlling to compensate for effects of the at least one operating condition on color.

30. The incremental printer of claim 14, wherein each environmental condition is selected from the group consisting of:
humidity,
pressure, and
temperature.

31. The incremental printer of claim 30, further comprising:
means, connected to the processor, for automatically providing to the processor information about at least one operating condition selected from the group consisting of:
type of such media,
color of such media, and
resolution; and
wherein the processor further comprises means for using said operating-condition information to modify said controlling to compensate for effects of the at least one operating condition on color.

32. The incremental printer of claim 14, wherein:
the at least one sensor comprises sensors for sensing plural environmental conditions; and
the processor further comprises means for using the plural environmental conditions together to compensate for interactive effects of the plural environmental conditions on color.

33. The incremental printer of claim 32, further comprising:
means, connected to the processor, for automatically providing to the processor information about at least one operating condition selected from the group consisting of:
type of such media,
color of such media, and
resolution; and
wherein the processor further comprises means for using said operating-condition information to modify said controlling to compensate for effects of the at least one operating condition on color.

34. The incremental printer of claim 14, particularly for use with a printing medium that is sensitive to excessive deposition of colorant or an associated carrier thereof, and further comprising:
means for limiting the amount of colorant or carrier deposited;
wherein the processor further comprises means for using the sensed at least one environmental condition to control the limiting means to avoid excess colorant or carrier deposition.

35. The printer of claim 14, wherein:
the at least one environmental condition comprises plural environmental conditions that each affect color; and
the compensating means comprise means for explicitly calculating effects of each of the plural sensed environmental conditions, considered both individually and in combination.

36. The printer of claim 35, wherein:
said means for calculating effects of conditions considered individually, constitute means for facilitating verification of correct response to each of the sensed environmental conditions considered individually.

37. The printer of claim 14, wherein:
the mathematical expression is in closed form.

38. The printer of claim 37, wherein:
the mathematical expression comprises coefficients developed iteratively.

39. The printer of claim 14, wherein:
the mathematical expression comprises coefficients developed through explicit iterative analysis of cross-combinations of different values of the plural environmental conditions, respectively.

40. The printer of claim 14, wherein:
the at least one environmental condition comprises plural environmental conditions that each affect color; and
the mathematical expression explicitly includes separate, distinct representations of each of the sensed plural environmental conditions.

41. The printer of claim 14, wherein:
the mathematical expression comprises a transfer function.

42. An incremental printer for use with a printing medium and comprising:
means for placing colorant on such medium to form an image;
at least one sensor for sensing at least one environmental condition that affects color of the formed image;
an automatic processor for controlling the placing means to form the image; said processor comprising:
means for automatically operating the at least one sensor immediately before printing;
means for using the sensed at least one environmental condition to modify said controlling of the placing means to compensate specifically for effects of the at least one environmental condition on color; and
means for applying a combination of a principal color calibration and a transfer function, to modify said controlling of the colorant placing means;
wherein the environmental-condition using means operate substantially only on the transfer function;
whereby the principal calibration is a substantially constant characterization of the printer.

43. An incremental printer for use with a printing medium and comprising:
means for placing colorant on such medium to form an image;
at least one sensor for sensing, immediately before printing, at least one environmental condition that affects color of the image;
an automatic processor for controlling the placing means to form the image; said processor comprising:
means for applying a combination of a principal color calibration with a transfer function, to modify said controlling of the placing means, and
means for using the sensed at least one environmental condition to modify substantially only said transfer function;
whereby the principal color calibration is a substantially constant characterization of the printer.

44. The incremental printer of claim 43, further comprising:
nonvolatile means for holding instructions for automatic operation of the at least one sensor and the processor.

45. The incremental printer of claim 43, wherein:
the colorant placing-means comprise, for each of plural colors, a respective inkjet pen that ejects inkdrops onto such printing medium;
wherein the inkdrops ejected by each pen have a respective drop weight characteristic of that pen;
further comprising means, connected to the processor, for informing the processor what the respective drop weight is; and
wherein the processor further comprises means for using the drop-weight information to modify substantially only said transfer function, to compensate for effects of drop weight on color.

46. A method for establishing and using a tabulation of coefficients for use in producing consistent response of an incremental printer whose image characteristics are subject to variable environmental or operating conditions, or both; said method comprising the steps of:
establishing a set of parameters that are such variable environmental or operating conditions, or both;
for each parameter, establishing values that are anticipated in use of the printer;
printing test patterns using crosscombinations of the established values;
photometrically measuring the test patterns;
defining at least one output image specification of interest;
for each crosscombination, calculating photometric error with respect to the at least one defined output specification;
for each crosscombination, first searching or analyzing the photometric errors to find an input inking specification that substantially produces the at least one defined output specification;
further analyzing the input inking specifications found for the crosscombinations, to find and tabulate coefficients for use in taking said variable conditions into account to print a desired image; and
storing the coefficients for later application to control operation of the printer.

47. The method of claim 46, wherein:
the first searching or analyzing step comprises entering the photometric errors, in association with the corresponding input inking specifications, into a regression calculation to fit the calculated photometric errors to at least one colorimetric function.

48. The method of claim 47, wherein:
the entering step comprises expressing the errors in an algebraically signed form.

49. The method of claim 47, wherein:
the at least one colorimetric function comprises a family of two-dimensional surfaces in a three-dimensional calculation space comprising three substantially orthogonal variables, namely: error in one perceptual color dimension, and two varying inks.

50. The method of claim 49, wherein:
the first searching or analyzing step further comprises, for each crosscombination, deducing the input inking specification from the family of two-dimensional surfaces.

51. The method of claim 50, wherein:
the deducing step is selected from the group consisting of:
further evaluating the regression calculations to concurrently match zero photometric error for each of three substantially orthogonal perceptual color dimensions respectively,
for plural candidate input inking specifications, concurrently displaying numerical representations of photometric error values, in a region of said three-dimensional calculation space generally established by the family of two-dimensional surfaces, to facilitate manual selection of one of the candidate specifications based upon consideration of the concurrently displayed numerical representations, displaying graphical representations of a region of said three-dimensional calculation space generally established by the family of two-dimensional surfaces, for visual interpretation thereof, to facilitate manual selection of the input inking specification therewithin based upon said visual interpretation, and locating a center of gravity of a geometrical figure bounded, substantially in a zero-photometric-error plane in said three-dimensional calculation space, by the family of two-dimensional surfaces.

52. The method of claim 47, wherein:

the first searching or analyzing step further comprises, for each crosscombination, deducing the input inking specification from the at least one colorimetric function.

53. The method of claim 47, wherein:

the further analyzing step comprises entering the input inking specifications into another regression calculation that fits the found input inking specifications to the environmental or operating conditions, or both.

54. The method of claim 46, wherein:

the further analyzing step comprises entering the input inking specifications into a regression calculation that fits the found input inking specifications to the environmental or operating conditions, or both.

55. The method of claim 46, further comprising the step of:

applying the coefficients to control operation of the printer.

56. The method of claim 55, wherein:

the applying step comprises using the coefficients to produce from input image data a modified form of the input image data, corrected for the environmental or operating conditions or both, for use in controlling the printer to print a desired image.

57. The method of claim 46, wherein:

the applying step comprises using the coefficients to construct a transfer function that is combined with a color calibration profile of the printer to modify the printer operation in accordance with the variable conditions.

58. The method of claim 46, wherein:

the image characteristics include color;

the test patterns include combinations of plural inks of different ink colors;

for each of the plural inks, the test patterns include multiple inking levels.

59. The method of claim 46, wherein the parameters are selected from the group consisting of:

humidity, temperature, pressure, resolution, the type of a printing medium to be used with the printer, the color of such medium, the age of a disposable module to be used with the printer, and the magnitude of a quantized colorant quantity, such as inkdrop weight, to be applied by the printer to such medium.

* * * * *